(12) United States Patent
Hatanaka et al.

(10) Patent No.: US 8,300,110 B2
(45) Date of Patent: Oct. 30, 2012

(54) IMAGE SENSING APPARATUS WITH CORRECTION CONTROL

(75) Inventors: Haruo Hatanaka, Osaka (JP); Shimpei Fukumoto, Osaka (JP); Yasuhiro Iijima, Osaka (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 291 days.

(21) Appl. No.: 12/641,616

(22) Filed: Dec. 18, 2009

(65) Prior Publication Data

US 2010/0157110 A1 Jun. 24, 2010

(30) Foreign Application Priority Data

Dec. 19, 2008 (JP) ................................. 2008-324428
Dec. 11, 2009 (JP) ................................. 2009-281307

(51) Int. Cl.
*H04N 5/235* (2006.01)
*H04N 5/228* (2006.01)
*G03B 17/00* (2006.01)

(52) U.S. Cl. ........... 348/221.1; 348/208.99; 348/208.13; 396/55

(58) Field of Classification Search .................. 348/241, 348/208.99, 208.13, 221.1; 396/52–55
See application file for complete search history.

(56) References Cited

U.S. PATENT DOCUMENTS

| 2002/0122133 | A1 | 9/2002 | Ejima |
|---|---|---|---|
| 2006/0033823 | A1* | 2/2006 | Okamura ................. 348/254 |
| 2007/0122139 | A1 | 5/2007 | Nomura et al. |
| 2007/0147824 | A1* | 6/2007 | Hamamura ................. 396/213 |
| 2008/0166115 | A1 | 7/2008 | Sachs et al. |
| 2008/0259175 | A1 | 10/2008 | Muramatsu et al. |
| 2008/0316334 | A1 | 12/2008 | Lee et al. |

FOREIGN PATENT DOCUMENTS

| JP | 2001346093 | 12/2001 |
|---|---|---|
| JP | 2002305682 | 10/2002 |
| JP | 2007006021 | 1/2007 |
| JP | 2007049374 | 2/2007 |
| JP | 2007150802 | 6/2007 |
| JP | 2007324770 | 12/2007 |
| JP | 2009111773 | 5/2009 |
| WO | 2007010891 | 1/2007 |

* cited by examiner

*Primary Examiner* — Lin Ye
*Assistant Examiner* — Mekonnen Dagnew
(74) *Attorney, Agent, or Firm* — NDQ&M Watchstone LLP

(57) ABSTRACT

An image sensing apparatus that includes an image sensing portion outputting the image data of an image by shooting and that generates an output image based on the output data of the image sensing portion obtained in response to a predetermined shooting command has: a first correction portion which, based on the image data of a first image shot by the image sensing portion and the image data of a second image shot by the image sensing portion with an exposure time longer than the exposure time of the first image, performs position adjustment between the first and second images and then synthesizes the first and second images to generate the output image; a second correction portion which generates the output image by reducing noise in the first image without using the second image; and a correction control portion which executes selection processing to alternatively select one of the first and second correction portions based on a shooting condition set for shooting of the second image or based on the output data of the image sensing portion, and which makes the so selected correction portion generate the output image.

5 Claims, 16 Drawing Sheets

SHORT-EXPOSURE
IMAGE

SUB   310

PROPER-EXPOSURE
IMAGE

SUB   311

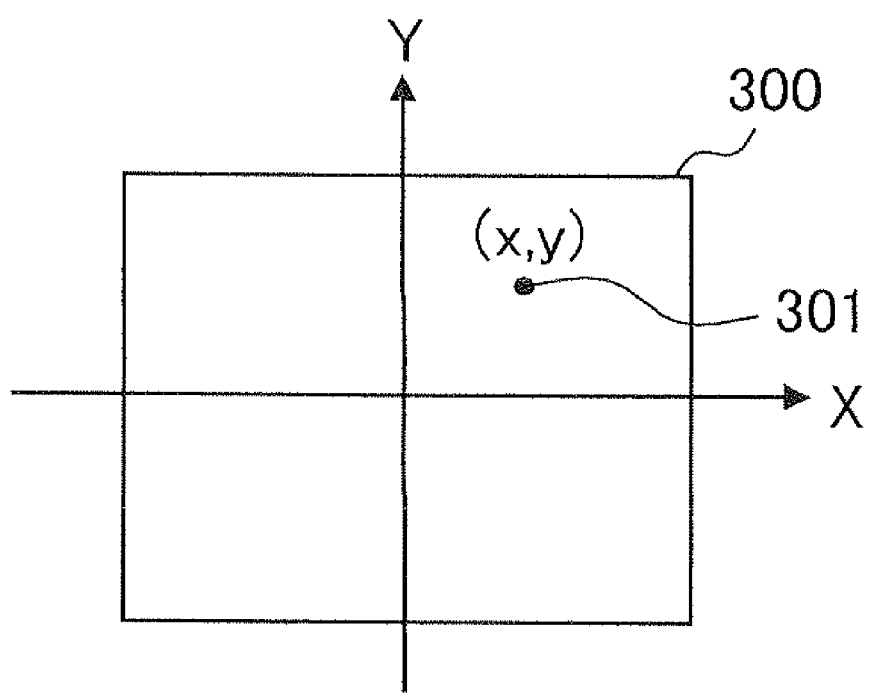

SHORT-
EXPOSURE
IMAGE

PROPER-
EXPOSURE
IMAGE

2ND INTERMEDIARY IMAGE

SUB   312

DIFFERENTIAL IMAGE

313

3RD INTERMEDIARY IMAGE

SUB   314

EDGE IMAGE

315

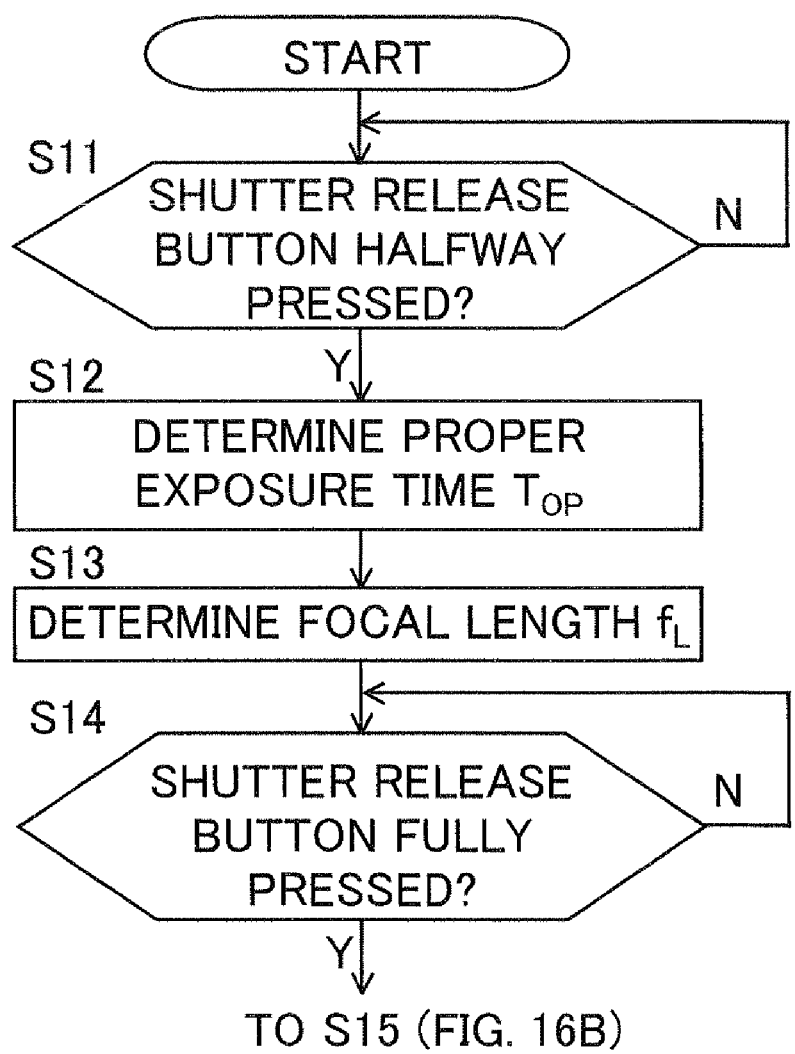

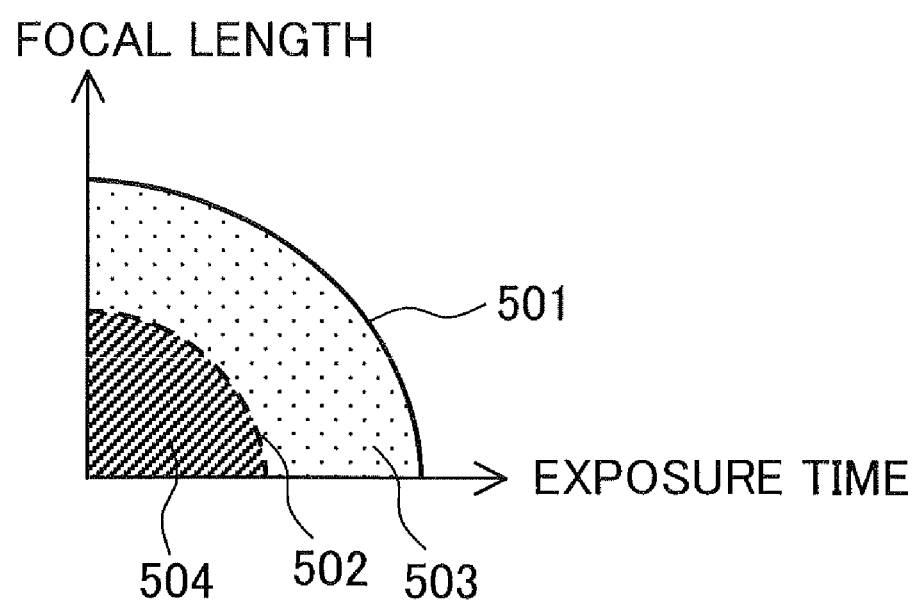

IMAGE SENSING APPARATUS WITH CORRECTION CONTROL

This nonprovisional application claims priority under 35 U.S.C. §119(a) on Patent Application No. 2008-324428 filed in Japan on Dec. 19, 2008 and Patent Application No. 2009-281307 filed in Japan on Dec. 11, 2009, the entire contents of both of which are hereby incorporated by reference.

BACKGROUND OF THE INVENTION

1. Field of the Invention

The present invention relates to image sensing apparatuses such as digital still cameras and digital video cameras.

2. Description of Related Art

Recent years have seen eager development of technologies for suppressing image blur ascribable to camera shake or subject movement. Some of such technologies achieve blur correction optically, but optical blur correction requires a sensor for detecting shake and a mechanism for optically compensating for it. Incorporation of such a sensor and a mechanism, however, is disadvantageous in terms of cost and compactness. This has led to proposal of various technologies for correcting blur through image processing after shooting.

For example, according to one conventional method, a first image having a high resolution but containing much noise is shot by exposure lasting for a short exposure time and in addition a second image having a low resolution but containing little noise is shot by exposure lasting for a long exposure time. Then, based on the image data of the first and second images, the displacement between the two images is detected; their positions are then so adjusted as to cancel the displacement, and thereafter the first and second images are synthesized to generate a corrected image.

Such image synthesis processing involving position adjustment between a first and a second image is intended to generate an image containing little blur and little noise, but the position adjustment cannot always be executed accurately. Failure of position adjustment may result in, in a corrected image, a subject appearing doubly or, in synthesis processing, an abnormally high synthesis ratio of one image, producing much blur or noise in a corrected image.

SUMMARY OF THE INVENTION

A first image sensing apparatus according to the present invention—an image sensing apparatus that includes an image sensing portion outputting the image data of an image by shooting and that generates an output image based on the output data of the image sensing portion obtained in response to a predetermined shooting command is provided with: a first correction portion which, based on the image data of a first image shot by the image sensing portion and the image data of a second image shot by the image sensing portion with an exposure time longer than the exposure time of the first image, performs position adjustment between the first and second images and then synthesizes the first and second images to generate the output image; a second correction portion which generates the output image by reducing noise in the first image without using the second image; and a correction control portion which executes selection processing to alternatively select one of the first and second correction portions based on a shooting condition set for shooting of the second image or based on the output data of the image sensing portion, and which makes the so selected correction portion generate the output image.

A second image sensing apparatus according to the present invention—an image sensing apparatus that includes an image sensing portion outputting the image data of an image by shooting and that generates an output image based on the output data of the image sensing portion obtained in response to a predetermined shooting command is provided with: a first correction portion which, based on the image data of a first image shot by the image sensing portion and the image data of a second image shot by the image sensing portion with an exposure time longer than the exposure time of the first image, performs position adjustment between the first and second images and then synthesizes the first and second images to generate the output image; a second correction portion which outputs the first image, or a corrected image obtained by correcting the first image, as the output image without using the second image; and a correction control portion which executes selection processing to alternatively select one of the first and second correction portions based on a shooting condition set for shooting of the first image, based on a shooting condition set for shooting of the second image, or based on the output data of the image sensing portion, and which makes the so selected correction portion generate the output image.

Specifically, for example, in the first or second image sensing apparatus, when the second correction portion is selected in the selection processing, the second image is not shot.

Specifically, for another example, in the first or second image sensing apparatus, taken as the shooting condition of the second image is the exposure time of the second image and a focal length at a time of shooting of the second image, and the correction control portion executes the selection processing based on at least one of the exposure time of the second image and the focal length.

More specifically, for example, in the first or second image sensing apparatus, the correction control portion checks whether the position adjustment succeeds or fails based on at least one of the exposure time of the second image and the focal length at the time of shooting of the second image; the correction control portion selects the first correction portion on judging that the position adjustment succeeds and selecting the second correction portion on judging that the position adjustment fails.

Instead, for example, in the first or second image sensing apparatus, the correction control portion checks whether the position adjustment succeeds or fails based on the output data of the image sensing portion obtained before or after the shooting command is given; the correction control portion selects the first correction portion on judging that the position adjustment succeeds and selecting the second correction portion on judging that the position adjustment fails.

For another example, in the first or second image sensing apparatus, by using an image degradation portion which generates an image by giving degradation-by-blurring to the first image and a noise reduction portion which generates an image by reducing noise in the first image, the second correction portion synthesizes the image generated by the image degradation portion and the image generated by the noise reduction portion to generate the output image.

For another example, in the first or second image sensing apparatus, the first correction portion generates the output image by synthesizing the first and second images and an image obtained by reducing noise in the first image.

The significance and benefits of the invention will be clear from the following description of its embodiments. It should however be understood that these embodiments are merely examples of how the invention is implemented, and that the meanings of the terms used to describe the invention and its

BRIEF DESCRIPTION OF THE DRAWINGS

FIG. 4 is a diagram showing a two-dimensional coordinate system in a spatial domain along with a two-dimensional image;

FIGS. 16A and 16B together show a flow chart representing the flow of the operation of the image sensing apparatus according to Example 2 of the invention;

FIG. 17 is a diagram illustrating a method for estimating whether position adjustment is likely to succeed or fail in terms of relationship between exposure time and focal length according to Example 2 of the invention.

DETAILED DESCRIPTION OF PREFERRED EMBODIMENTS

Hereinafter, embodiments of the present invention will be described specifically with reference to the accompanying drawings. Among the drawings referred to in the course, the same parts are identified by common reference signs, and in principle no overlapping description of the same parts will be repeated. Before the description of a first to a third examples, the features common to those examples, or referred to in the description of those examples, will be described first.

Figure 1:
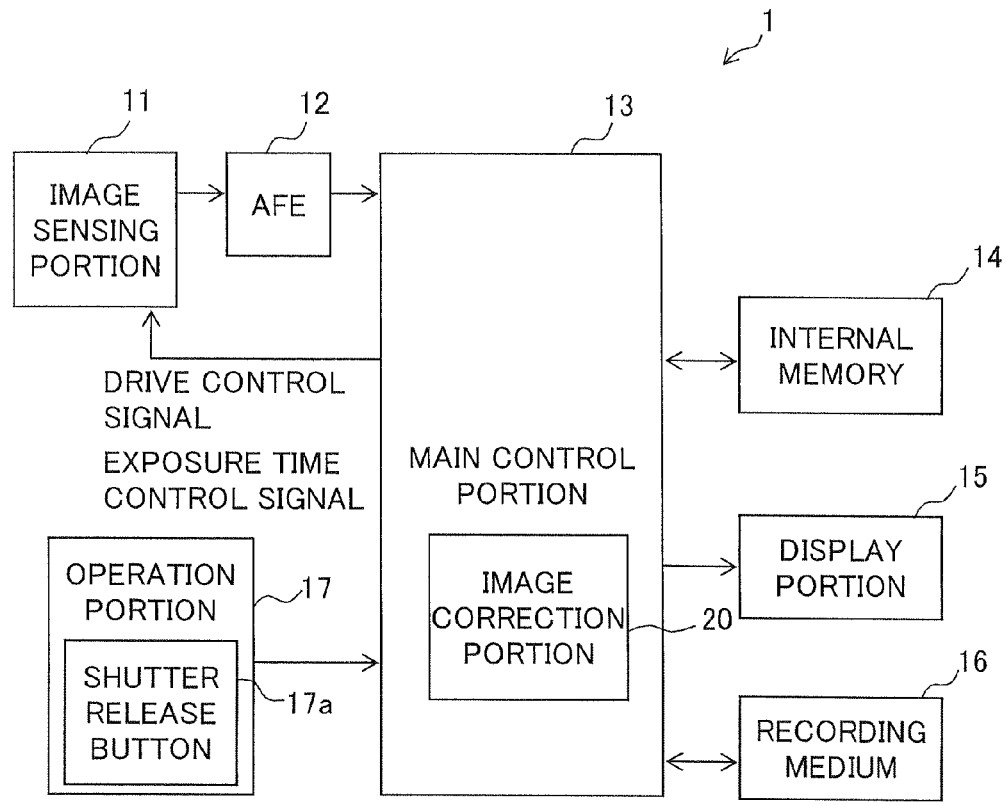
FIG. 1 is an overall block diagram of an image sensing apparatus embodying the invention.

FIG. 1 is an overall block diagram of an image sensing apparatus 1 embodying the invention. The image sensing apparatus 1 is, for example, a digital still camera capable of shooting and recording still images, or a digital video camera capable of shooting and recording still and moving images. It should be understood that (image) shooting is synonymous with image sensing.

The image sensing apparatus 1 is provided with an image sensing portion 11, an AFE (analog front end) 12, a main control portion 13, an internal memory 14, a display portion 15, a recording medium 16, and an operation portion 17. The main control portion 13 is provided with an image correction portion 20. The operation portion 17 is provided with a shutter release button 17a. Although this embodiment assumes that the display portion 15 is provided in the image sensing apparatus 1, the display portion 15 may instead be provided outside, or externally to, the image sensing apparatus 1.

Figure 2:
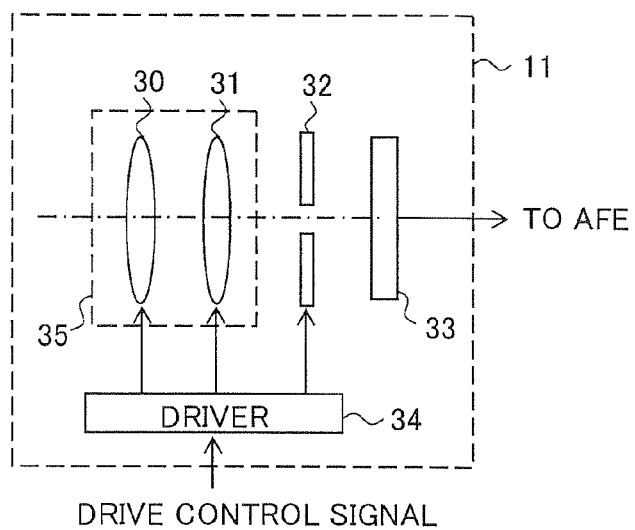
FIG. 2 is an internal configuration diagram of the image sensing portion in FIG. 1.

FIG. 2 is an internal configuration diagram of the image sensing portion 11. The image sensing portion 11 has an optical system 35, an aperture stop 32, an image sensor 33 comprising a CCD (charge-coupled device) or CMOS (complementary metal oxide semiconductor) image sensor or the like, and a driver 34 for driving and controlling the optical system 35 and the aperture stop 32. The optical system 35 is composed of a plurality of lenses including a zoom lens 30 and a focus lens 31. The zoom lens 30 and the focus lens 31 are movable along the optical axis. According to a drive control signal from the main control portion 13, the driver 34 drives and controls the positions of the zoom lens 30 and the focus lens 31 and the aperture size of the aperture stop 32, and thereby controls the focal length (angle of view) and focal position of the image sensing portion 11 and the amount of light incident on the image sensor 33.

The image sensor 33 photoelectrically converts the optical image—representing the subject—formed on it through the optical system 35 and the aperture stop 32, and outputs the electrical signal resulting from the photoelectric conversion to the AFE 12. More specifically, the image sensor 33 is provided with a plurality of light-receiving pixels arrayed two-dimensionally in a matrix formation. The light-receiving pixels each store an amount of signal charge commensurate with the exposure time (the length of the period for which they are exposed). The analog signals from the individual light-receiving pixels, having magnitudes proportional to the amounts of signal charge thus stored, are outputted to the AFE 12 sequentially in synchronism with drive pulses generated within the image sensing apparatus 1. In the following description, "exposure" refers to exposure of the image sensor 33.

The AFE 12 amplifies the analog signals outputted from the image sensing portion 11 (image sensor 33), and converts the amplified analog signals into digital signals. The AFE 12 outputs these digital signals sequentially to the main control portion 13.

The main control portion 13 is provided with a CPU (central processing unit), ROM (read-only memory), RAM (random-access memory), etc., and functions as a video signal processing portion. Based on the output signal of the AFE 12, the main control portion 13 generates a video signal that represents the image shot by the image sensing portion 11 (hereinafter also referred to as the "shot image"). The main control portion 13 also functions as a display control means for controlling what is displayed on the display portion 15, by controlling the display portion 15 in a way necessary to achieve display. The main control portion 13 also outputs to the image sensing portion 11 an exposure time control signal for controlling the exposure time of the image sensor 33. The function of the image correction portion 20 provided in the main control portion 13 will be described later.

The internal memory 14 is formed of SDRAM (synchronous dynamic random-access memory) or the like, and temporarily stores various kinds of data generated within the image sensing apparatus 1. The display portion 15 is a display device comprising a liquid crystal display panel or the like, and under the control of the main control portion 13 displays the shot image, or an image recorded on the recording medium 16, etc. The recording medium 16 is a non-volatile memory such as an SD (Secure Digital) memory card, and under the control of the main control portion 13 stores the shot image etc.

The operation portion 17 accepts operation from outside. How the operation portion 17 is operated is conveyed to the main control portion 13. The shutter release button 17a is a button for commanding shooting and recording of an image.

The shutter release button 17a is so formed that it can be pressed in two stages. When pressed lightly in by the camera operator (photographer, or movie shooter), the shutter release button 17a goes into a halfway pressed state; when pressed further in from that state, the shutter release button 17a goes into a fully pressed state.

The shot image may contain blur ascribable to camera shake. The image correction portion 20 is provided with a function of, without using a sensor—such as an angular velocity sensor—for detecting camera shake, generating an image containing less blur (blur-reduced image) through image processing using the image data carried by the output signal of the image sensing portion 11. The blur-reduced image to be generated by the image correction portion 20 will in the following description be referred to especially as the "correction aim image."

The correction aim image is generated based on a proper-exposure image and a short-exposure image, or based on a short-exposure image alone. A proper-exposure image denotes an image obtained from the image sensor 33 by shooting with exposure lasting for a proper exposure time $T_{OP}$, and a short-exposure image denotes an image obtained from the image sensor 33 by shooting with exposure lasting for an exposure time $T_{SH}$ shorter than the $T_{OP}$.

The sensitivity at the time of acquisition of the short-exposure image is adjusted such that the lightness of the shot image is substantially the same between the short-exposure image and the proper-exposure image. Specifically, so that the lightness of the shot image may be substantially the same between the short-exposure image and the proper-exposure image, based on the ratio of the proper exposure time $T_{OP}$ and the exposure time $T_{SH}$, the sensitivity at the time of acquisition of the short-exposure image is made higher than the sensitivity at the time of acquisition of the proper-exposure image. The sensitivity here is, for example, the ISO sensitivity. The ISO sensitivity is the measure of sensitivity defined by ISO (International Organization for Standardization); adjusting the ISO sensitivity allows adjustment of the lightness (luminance level) of the shot image. In practice, according to the ISO sensitivity, the amplification factor of signal amplification in the AFE 12 is determined. The amplification factor is proportional to the ISO sensitivity. Doubling the ISO sensitivity doubles the amplification factor, resulting in doubling the luminance values (i.e., lightness) at the individual pixels of the shot image (here, however, saturation that may result from amplification is ignored). The luminance value of a pixel denotes the value of the luminance signal at that pixel.

Since the short-exposure image is shot with a comparatively short exposure time, it contains relatively little blur ascribable to camera shake or subject movement. Accordingly, the short-exposure image renders edges sharp. Since the sensitivity at the time of its shooting is high, however, the short-exposure image contains relatively much noise.

In contrast, since the proper-exposure image is shot with a comparatively long exposure time, it contains relatively little noise. Since its exposure time is long, however, the proper-exposure image tends to contain blur ascribable to camera shake or subject movement.

Figure 3A:
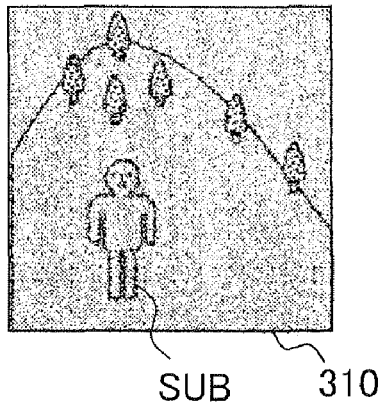
FIGS. 3A and 3B are diagrams showing examples of a short-exposure image and a proper-exposure image, respectively, shot by the image sensing apparatus of FIG. 1.
Figure 3B:
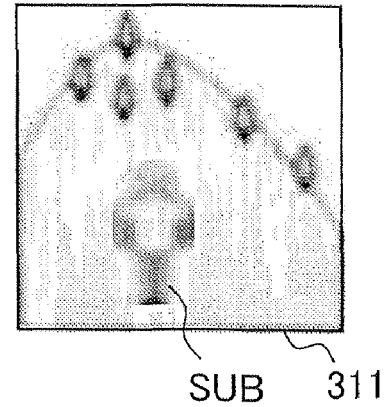

FIGS. 3A and 3B show examples of the short- and proper-exposure images. The images 310 and 311 are examples of the short- and proper-exposure images respectively. The short-exposure image 310 and the proper-exposure image 311 are obtained by shooting a person SUB, as a subject of interest, standing against the background of a mountain, as a background subject.

Compared with the proper-exposure image 311, the short-exposure image 310 renders edges sharp but contains relatively much noise (corresponding to black spots in FIG. 3A). On the other hand, compared with the short-exposure image 310, the proper-exposure image 311 contains little noise but shows the person SUB greatly blurred. Moreover, FIGS. 3A and 3B assume that, during shooting of the short- and proper-exposure images 310 and 311, the person SUB moves. As a result, relative to the position of the person SUB on the short-exposure image 310, the person SUB on the proper-exposure image 311 is located to the right, and in addition the person SUB on the proper-exposure image 311 is blurred due to subject movement.

As shown in FIG. 4, in a spatial domain, a two-dimensional coordinate system XY is defined on which to map any two-dimensional image 300 for the sake of consideration. The image 300 may be, for example, the proper-exposure image, the short-exposure image, the correction aim image, or any of a first to a third intermediary image and a pseudo-proper-exposure image, which will be described later. The X- and Y-axes are aligned with the horizontal and vertical directions, respectively, of the two-dimensional image 300. The two-dimensional image 300 is formed of a plurality of pixels arrayed in both the horizontal and vertical directions in a matrix formation, and the position of a given pixel 301 on the two-dimensional image 300 is represented by (x, y). In the present specification, the position of a pixel is also referred to simply as a pixel position. The symbols x and y represent the coordinates of the pixel 301 in the X- and Y-axis directions respectively. On the two-dimensional coordinate system XY, a rightward shift by one pixel in the position of a given pixel results in an increase by one in its coordinate in the X-axis direction, and an upward shift by one pixel in the position of a given pixel results in an increase by one in its coordinate in the Y-axis direction. Accordingly, when the position of the pixel 301 is (x, y), the positions of the pixels adjacent to it on the right, on the left, above, and below are represented by (x+1, y), (x−1, y), (x, y+1), and (x, y−1) respectively.

Below will be presented a first to a third examples (Examples 1 to 3) of the invention as examples for illustrating the configuration and operation of the image sensing apparatus 1 (and in particular the image correction portion 20). Unless inconsistent, any feature described with regard to one example is applicable to any other example. Since Example 1 includes those technologies that form the basis for the technologies used in Examples 2 and 3, any feature described with regard to Example 1 in particular is, unless inconsistent, applicable to Examples 2 and 3.

EXAMPLE 1

First, Example 1 of the invention will be described. In Example 1, as the shutter release button 17a is pressed, a short-exposure image and a proper-exposure image are acquired in the following manner.

When the shutter release button 17a is recognized to be in the halfway pressed state, the main control portion 13 executes pre-exposure, and determines the proper exposure time $T_{OP}$ based on the level of the output signal of the AFE 12 resulting from the pre-exposure. Pre-exposure denotes exposure performed prior to exposure for a short-exposure image and a proper-exposure image. When thereafter the shutter release button 17a is recognized to be in the fully pressed state, a short-exposure image and a proper-exposure image are shot consecutively. The short- and proper-exposure images may be shot the former first and the latter next, or the latter first and the former next. In either case, the two images are shot consecutively with as short an interval as possible between their exposure. As described previously, the proper-exposure image is shot with a proper exposure time $T_{OP}$, and the short-exposure image is shot with an exposure time $T_{SH}$ shorter than the proper exposure time $T_{OP}$. For example, the exposure time $T_{SH}$ is set equal to or shorter than the camera shake limit exposure time, which corresponds to the reciprocal of the focal length of the optical system 35. $T_{SH}$ may be set at, for example, $T_{OP}/4$.

Figure 5:
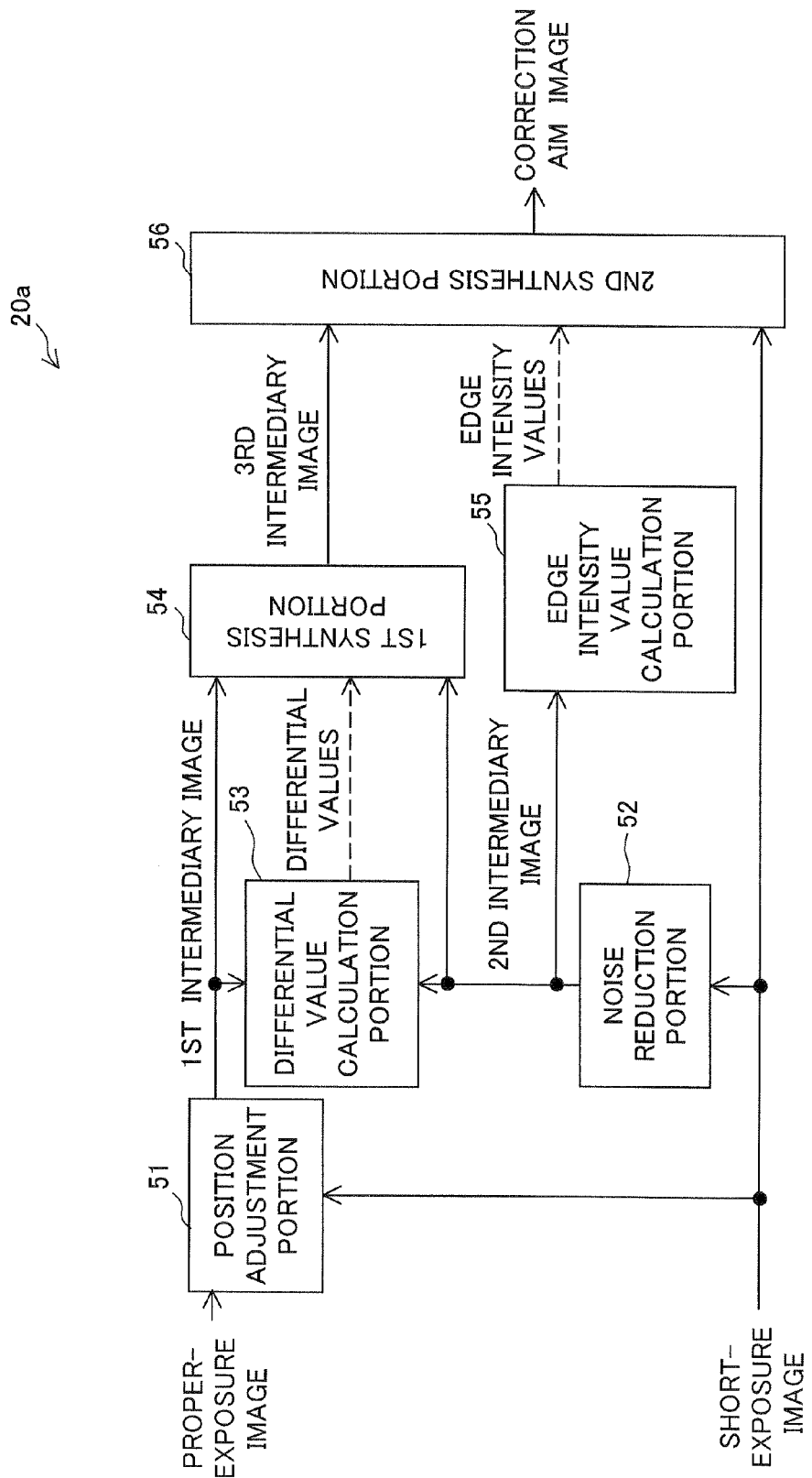
FIG. 5 is an internal block diagram of an image correction portion according to Example 1 of the invention.

FIG. 5 is an internal block diagram of an image correction portion 20a according to Example 1. In Example 1, the image correction portion 20a is used as the image correction portion 20 in FIG. 1. The image data of the short- and proper-exposure images shot as described above is fed to the image correction portion 20a. Image data denotes data representing the color and luminance of an image.

The image correction portion 20a is provided with the following blocks: a position adjustment portion 51 that detects the displacement (difference in position) between the short- and proper-exposure images and performs position adjustment between the two image; a noise reduction portion 52 that reduces noise contained in the short-exposure image; a differential value calculation portion 53 that finds the differential between the position-adjusted proper-exposure image and the noise-reduced short-exposure image to calculate the differential values at individual pixel positions; a first synthesis portion 54 that synthesizes the position-adjusted proper-exposure image and the noise-reduced short-exposure image at a synthesis ratio based on the differential value; an edge intensity value calculation portion 55 that extracts edges from the noise-reduced short-exposure image to calculate an edge intensity value; and a second synthesis portion 56 that synthesizes the short-exposure image and the image synthesized by the first synthesis portion 54 at a synthesis ratio based on the edge intensity value to generate a correction aim image.

The operation of the individual blocks in the image correction portion 20a will now be described in detail. It should be understood that what is referred to simply as the short-exposure image is the short-exposure image as it has undergone no noise reduction processing by the noise reduction portion 52, and this applies also in the other examples described later. The example of the short-exposure image 310 shown in FIG. 3A is one that has undergone no noise reduction by the noise reduction portion 52.

Based on the image data of the short- and proper-exposure images, the position adjustment portion 51 detects the displacement between them, and based on the detected displacement performs position adjustment between the short- and proper-exposure images. Since the short- and proper-exposure images are shot consecutively as described above, the shooting regions is substantially the same between shooting of the two images, but since the shooting time is not completely the same between shooting of the two images, the shooting region slightly differs between the two images. Consequently, the position at which the image data of the same subject exists may slightly differ between on the short-exposure image and on the proper-exposure image.

The position adjustment portion 51 detects that displacement, and applies coordinate conversion to the coordinates of the individual pixels of the proper-exposure image in such a way as to cancel the detected displacement. This, if errors are ignored, makes the position at which the image data of the same subject exists completely coincident between on the short-exposure image and on the proper-exposure image after coordinate conversion.

For displacement detection, the position adjustment portion 51 may adopt any method that permits detection of a displacement between two images based on the image data of the two images. For example, displacement detection can be achieved by a representative point matching method, a block matching method, or a gradient method. As an example, how a displacement is detected in a case where a block matching method is used will be described below with reference to FIGS. 6A and 6B.

Figure 6A:
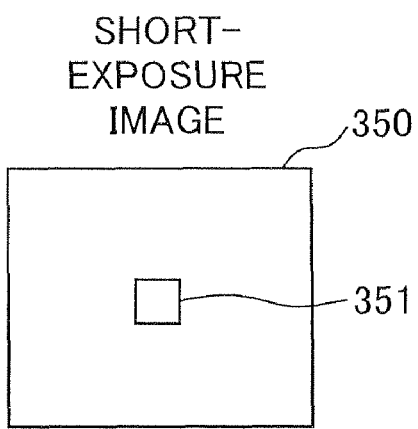
FIGS. 6A and 6B are diagrams illustrating block matching between a short-exposure image and a proper-exposure image.
Figure 6B:
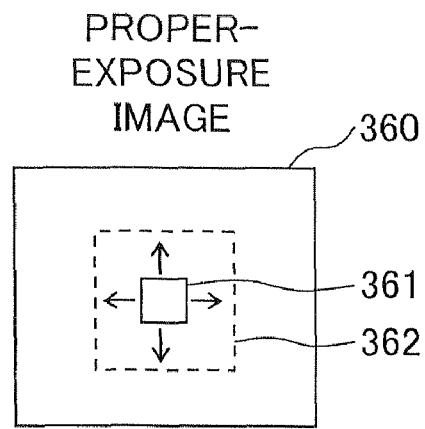

In FIG. 6A, the reference sign 350 indicates the short-exposure image, and the reference sign 351 indicates a block of interest that is set within the short-exposure image 350. The block of interest 351 is part of the entire image region (the image region of the whole) of the short-exposure image 350. In FIG. 6B, the reference sign 360 indicates the proper-exposure image, and the reference sign 361 indicates a candidate block set within the proper-exposure image 360. The candidate block 361 is part of the entire image region of the proper-exposure image 360. The block of interest 351 and the candidate block 361 have the same image size (are formed of the same number of pixels). In FIG. 6B, the area 362 within the broken-line rectangular region is a search area within which the candidate block 361 can be located. The search area 362 is, for example, a rectangular area with its center at the center position of the block of interest 351.

The position adjustment portion 51 calculates the correlation value between the image within the block of interest 351 and the image within the candidate block 361. Meanwhile, the candidate block 361 is moved, one pixel at a time, in the horizontal or vertical direction within the search area 362, and every time it is so moved, the correlation value is calculated. Taken as the correlation value is, for example, the sum of the absolute values of differences in luminance between corresponding pixels of the block of interest 351 and the candidate block 361. Specifically, for example, of all the pixels within the block of interest 351, one after another is taken as a pixel of interest; for each such pixel of interest, the absolute value of the difference between the luminance value of the pixel of interest within the block of interest 351 and the luminance value of the pixel corresponding to the pixel of interest within the candidate block 361 is found; then the sum of the absolute values so found (of which the number equals the number of pixels in the block of interest 351) is calculated as the correlation value. This correlation value calculated as a sum is generally called a SAD (sum of absolute differences). Instead of a SAD, which is the sum of the absolute values of luminance differences, a SSD (sum of squared differences), which is the sum of the squares of luminance differences, may be found as the correlation value.

The correlation value indicates the similarity between the image within the block of interest 351 and the image within the candidate block 361; the higher the similarity between the images, the smaller the corresponding correlation value. The position adjustment portion 51 identifies the center position of the candidate block 361 at which the correlation value is the smallest, and finds, as a movement vector, the vector directed from the center position of the block of interest 351 to the center position of the candidate block 361. The direction and magnitude of this movement vector represent the direction and magnitude of the displacement of the proper-exposure image relative to the short-exposure image.

Based on the displacement (movement vector) thus found, the position adjustment portion 51 applies the above-mentioned coordinate conversion to the proper-exposure image to correct the displacement. In Example 1, the resulting displacement-corrected proper-exposure image (in other words, position-adjusted proper-exposure image) functions as a first intermediary image.

The noise reduction portion 52 applies noise reduction processing to the short-exposure image, and thereby reduces noise contained in the short-exposure image. The noise reduction processing in the noise reduction portion 52 can be achieved by any spatial domain filtering fit for noise reduction. In the spatial domain filtering in the noise reduction portion 52, it is preferable to adopt a spatial domain filter that retains edges as much as possible, and accordingly, for example, spatial domain filtering using a median filter is adopted.

The noise reduction processing in the noise reduction portion 52 may instead be achieved by any frequency domain filtering fit for noise reduction. In a case where frequency domain filtering is adopted in the noise reduction portion 52, it is preferable to use a low-pass filter that, of different spatial frequency components contained in the short-exposure image, passes those lower than a predetermined cut-off frequency and attenuates those equal to or higher than the cut-off frequency. Also through spatial domain filtering using a median filter or the like, it is possible, of different spatial frequency components contained in the short-exposure image, to retain those of relatively low frequencies almost intact and attenuate those of relatively high frequencies. Thus, spatial domain filtering using a median filter or the like can be thought of as a kind of filtering using a low-pass filter.

Figure 7:
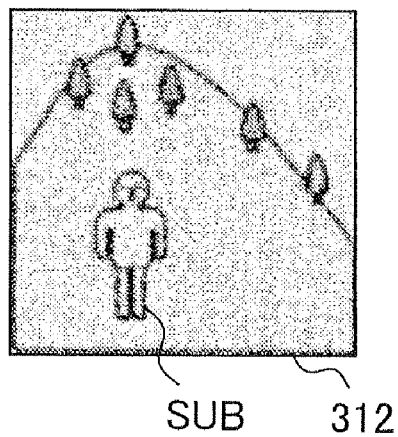
FIG. 7 is a diagram showing a second intermediary image obtained by reducing noise in the short-exposure image in FIG. 3A.

The short-exposure image having undergone the noise reduction by the noise reduction portion 52 is called the second intermediary image. FIG. 7 shows the second intermediary image 312 obtained by applying noise reduction processing to the short-exposure image 310 in FIG. 3A. As will be clear from a comparison between FIG. 3A and FIG. 7, in the second intermediary image 312, the noise contained in the short-exposure image 310 is reduced, while edges are slightly less sharp than in the short-exposure image 310.

The differential value calculation portion 53 calculates the differential values at individual pixel positions between the first and second intermediary images. The differential value at pixel position (x, y) is represented by DIF(x, y). The differential value DIF(x, y) represents the difference in luminance and/or color between the pixel at pixel position (x, y) on the first intermediary image and the pixel at pixel position (x, y) on the second intermediary image.

The differential value calculation portion 53 calculates the differential value DIF(x, y), for example, according to formula (1) below. Here, $P1_Y(x, y)$ represents the luminance value of the pixel at pixel position (x, y) on the first intermediary image, and $P2_Y(x, y)$ represents the luminance value of the pixel at pixel position (x, y) on the second intermediary image.

$$DIF(x,y) = |P1_Y(x,y) - P2_Y(x,y)| \tag{1}$$

The differential value DIF(x, y) may be calculated, instead of according to formula (1), according to formula (2) or (3) below by use of signal values in an RGB format. Here, $P1_R(x, y)$, $P1_G(x, y)$, and $P1_B(x, y)$ represent the values of the R, G, and B signals, respectively, of the pixel at pixel position (x, y) on the first intermediary image, and $P2_R(x, y)$, $P2_G(x, y)$, and $P2_B(x, y)$ represent the values of the R, G, and B signals, respectively, of the pixel at pixel position (x, y) on the second intermediary image. The R, G, and B signals of a given pixel are the color signals that represent the intensity of red, green, and blue, respectively, at that pixel.

$$DIF(x,y) = |P1_R(x,y) - P2_R(x,y)| + |P1_G(x,y) - P2_G(x,y)| + |P1_B(x,y) - P2_B(x,y)| \tag{2}$$

$$DIF(x,y) = [\{P1_R(x,y) - P2_R(x,y)\}^2 + \{P1_G(x,y) - P2_G(x,y)\}^2 + \{P1_B(x,y) - P2_B(x,y)\}^2]^{1/2} \tag{3}$$

The above-described method of calculating the differential value DIF(x, y) according to formula (1), (2), or (3) is merely an example; that is, the differential value DIF(x, y) may be found by any other method. The differential value DIF(x, y) may be calculated, for example, by use of signal values in a YUV format by a method similar to that using signal values in an RGB format. In that case, R, G, and B in formulae (2) and (3) are read as Y, U, and V respectively. Signals in a YUV format consist of a luminance signal identified by Y and color-difference signals identified by U and V.

Figure 8:
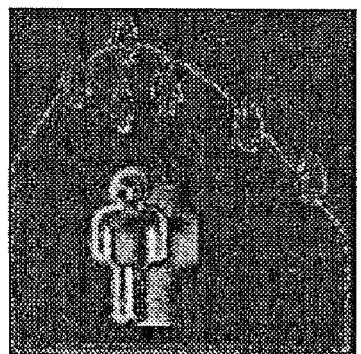
FIG. 8 is a diagram showing a differential image between a position-adjusted proper-exposure image (first intermediary image) and a noise-reduced short-exposure image (second intermediary image)

FIG. 8 shows an example of a differential image that has as its pixel signal values the differential values DIF(x, y) at individual pixel positions. The differential image 313 in FIG. 8 are based on the short- and proper-exposure images 310 and 311 in FIGS. 3A and 3B. In the differential image 313, parts where the differential value DIF(x, y) is relatively large appear white, and parts where the differential value DIF(x, y) is relatively small appear black. Due to movement of the person SUB during shooting of the short- and proper-exposure images 310 and 311, the differential value DIF(x, y) is relatively large in the person SUB's movement region on the differential image 313. Moreover, due to blur on the proper-exposure image 311 ascribable to camera shake, the differential value DIF(x, y) is large also near edges (the outlines of the person and the mountain).

The first synthesis portion 54 synthesizes the first and second intermediary images, and outputs the resulting synthesized image as a third intermediary image. The synthesis here is achieved by performing weighted addition on the pixel signals of corresponding pixels between the first and second intermediary images. Through weighted addition, pixel signals are mixed between corresponding pixels, and here the mix ratio (in other words, the synthesis ratio) can be determined based on the differential value DIF(x, y). The mix ratio with respect to pixel position (x, y) as determined by the first synthesis portion 54 is represented by α(x, y).

Figure 9:
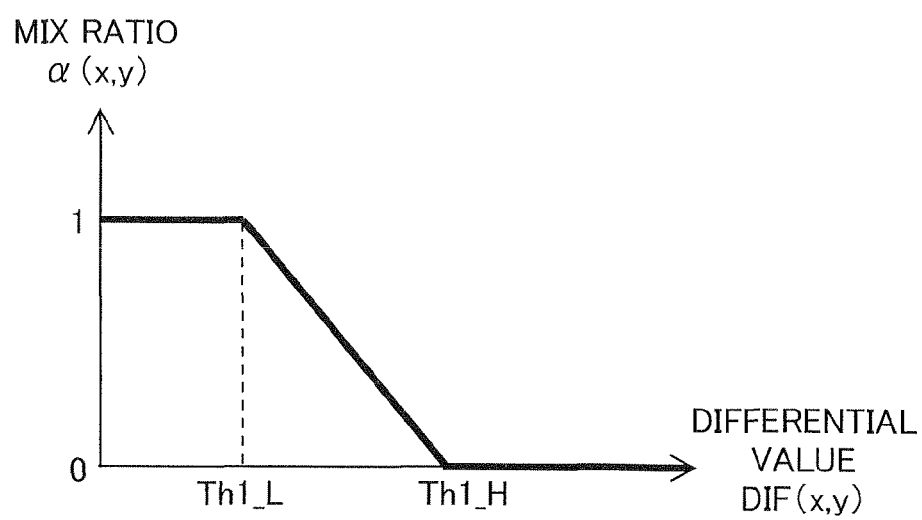
FIG. 9 is a diagram showing a relationship between a differential value obtained in the differential value calculation portion in FIG. 5 and a mix ratio at which pixel signals of the first and second intermediary images are mixed.

An example of the relationship between the differential value DIF(x, y) and the mix ratio α(x, y) is shown in FIG. 9. In a case where the example of the relationship in FIG. 9 is adopted, when "DIF(x, y)<Th1_L" holds, "α(x, y)=1";

when "Th1_L≦DIF(x, y)<Th1_H" holds, "α(x, y)=1−(DIF(x, y)−Th1_L)/(Th1_H−Th1_L)"; and when "Th1_H≦DIF(x, y)" holds, "α(x, y)=0."

Here, Th1_L and Th1_H are predetermined threshold values that fulfill "0<Th1_L<Th1_H." In a case where the example of the relationship in FIG. 9 is adopted, as the differential value DIF(x, y) increases from the threshold value Th1_L to the threshold value Th1_H, the corresponding mix ratio α(x, y) linearly decreases from 1 to 0. The mix ratio α(x, y) may instead be made to decrease non-linearly.

The first synthesis portion 54 determines, from the differential values DIF(x, y) at individual pixel positions, the mix ratios α(x, y) at those pixel positions, and then mixes the pixel signals of corresponding pixels between the first and second intermediary images according to formula (4) below to generate the pixel signals of the third intermediary image. Here, P1(x, y), P2(x, y), and P3(x, y) represent the pixel signals at pixel position (x, y) on the first, second, and third intermediary images respectively.

$$P3(x,y)=\alpha(x,y)\times P1(x,y)+\{1-\alpha(x,y)\}\times P2(x,y) \quad (4)$$

The pixel signals P1(x, y), P2(x, y), and P3(x, y) represent the luminance and color of the pixel at pixel position (x, y) on the first, second, and third intermediary images respectively, and represent them, for example, in an RGB or YUV format. For example, in a case where the pixel signals P1(x, y) etc. each consist of R, G, and B signals, for each of the R, G, and B signals, the pixel signals P1(x, y) and P2(x, y) are mixed to generate the pixel signal P3(x, y). A case where the pixel signals P1(x, y) etc. each consist of Y, U, and V signals can be dealt with by similar processing.

Figure 10:
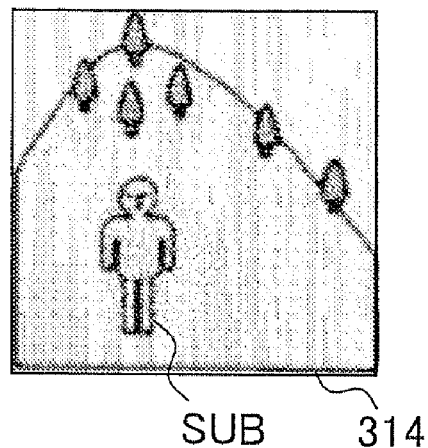
FIG. 10 is a diagram showing a third intermediary image obtained by synthesizing a position-adjusted proper-exposure image (first intermediary image) and a noise-reduced short-exposure image (second intermediary image)

FIG. 10 shows an example of the third intermediary image obtained in the first synthesis portion 54. The third intermediary image 314 shown in FIG. 10 is based on the short- and proper-exposure images 310 and 311 shown in FIGS. 3A and 3B.

As described above, in the region in which the person SUB moved, the differential value DIF(x, y) is relatively large, and accordingly the degree of contribution (1−α(x, y)) of the second intermediary image 312 (see FIG. 7) to the third intermediary image 314 is relatively high. Consequently, the blur in the third intermediary image 314 ascribable to subject movement is greatly reduced compared with that in the proper-exposure image 311 (see FIG. 3B). The differential value DIF(x, y) is large also near edges, and accordingly the just-mentioned degree of contribution (1−α(x,y)) is high also there. Consequently, the sharpness of edges in the third intermediary image 314 is improved compared with that in the proper-exposure image 311. Since, however, edges in the second intermediary image 312 are slightly less sharp than those in the short-exposure image 310, edges in the third intermediary image 314 also are slightly less sharp than those in the short-exposure image 310.

On the other hand, a region where the differential value DIF(x, y) is relatively small is supposed to be a flat region containing a small edge component. Accordingly, for a region with a relatively small differential value DIF(x, y), as described above, the degree of contribution α(x, y) of the first intermediary image, which contains little noise, is made comparatively high. This helps suppress noise in the third intermediary image low. It should be noted that, since the second intermediary image is generated through noise reduction processing, noise is hardly visible even in a region where the degree of contribution (1−α(x, y)) of the second intermediary image to the third intermediary image is relatively high.

As described above, edges in the third intermediary image are slightly less sharp than those in the short-exposure image. This unsharpness is improved by the edge intensity value calculation portion 55 and the second synthesis portion 56.

The edge intensity value calculation portion 55 performs edge extraction processing on the second intermediary image to calculate the edge intensity values at individual pixel positions. The edge intensity value at pixel position (x, y) is represented by E(x, y). The edge intensity value E(x, y) indicates the amount of variation among the pixel signals within a small block centered around pixel position (x, y) on the second intermediary image; the larger the amount of variation, the larger the edge intensity value E(x, y).

For example, the edge intensity value E(x, y) is found according to formula (5) below. As described above, P2$_Y$(x, y) represents the luminance value of the pixel at pixel position (x, y) on the second intermediary image. Fx(i, j) and Fy(i, j) represent the filter coefficients of the edge extraction filter for extracting edges in the horizontal and vertical directions respectively. Usable as the edge extraction filter is any spatial domain filter fit for edge extraction, of which examples include a differentiating filter, a Prewitt filter, and a Sobel filter.

$$E(x, y) = \left| \sum_{i=-1}^{1} \sum_{j=-1}^{1} Fx(i, j) \cdot P2_Y(x+i, y+j) \right| + \left| \sum_{i=-1}^{1} \sum_{j=-1}^{1} Fy(i, j) \cdot P2_Y(x+i, y+j) \right| \quad (5)$$

For example, in a case where a Prewitt filter is used, Fx(i, j) in formula (5) is substituted by "Fx(−1, −1)=Fx(−1, 0)=Fx(−1, 1)=−1", "Fx(0, −1)=Fx(0, 0)=Fx(0, 1)=0," and "Fx(1, −1)=Fx(1, 0)=Fx(1, 1)=1," and Fy(i, j) in formula (5) is substituted by "Fy(−1, −1)=Fy(0, −1)=Fy(1, −1)=−1", "Fy(−1, 0)=Fy(0, 0)=Fy(1, 0)=0," and "Fy(−1, 1)=Fy(0, 1)=Fy(1, 1)=1." Needless to say, these filter coefficients are merely examples, and the edge extraction filter for calculating the edge intensity value E(x, y) can be modified in many ways. Although formula (5) uses an edge extraction filter with a filter size of 3×3, the edge extraction filter may have any filter size other than 3×3.

Figure 11:
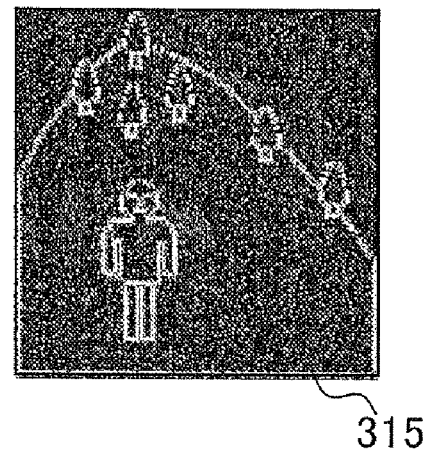
FIG. 11 is a diagram showing an edge image obtained by applying edge extraction processing to a noise-reduced short-exposure image (second intermediary image)

FIG. 11 shows an example of an edge image that has as its pixel signal values the edge intensity values E(x, y) at individual pixel positions. The edge image 315 in FIG. 11 is based on the short- and proper-exposure images 310 and 311 in FIGS. 3A and 3B. In the edge image 315, parts where the edge intensity value E(x, y) is relatively large appear white, and parts where the edge intensity value E(x, y) is relatively small appear black. The edge intensity value E(x, y) is obtained by extracting edges from the second intermediary image 312, which is obtained by reducing noise in the short-exposure image 310, which contains sharp edges. Thus, edges are separated from noise, and with a clear distinction made between edges in the subject and noise, the edge intensity value E(x, y) identifies the position of edges.

The second synthesis portion 56 synthesizes the third intermediary image and the short-exposure image, and outputs the resulting synthesized image as the correction aim image. The synthesis here is achieved by performing weighted addition on the pixel signals of corresponding pixels between the third intermediary image and the short-exposure image. Through weighted addition, pixel signals are mixed between corresponding pixels, and here the mix ratio (in other words, the synthesis ratio) can be determined based on the edge intensity value E(x, y). The mix ratio with respect to pixel position (x, y) as determined by the second synthesis portion 56 is represented by β(x, y).

Figure 12:
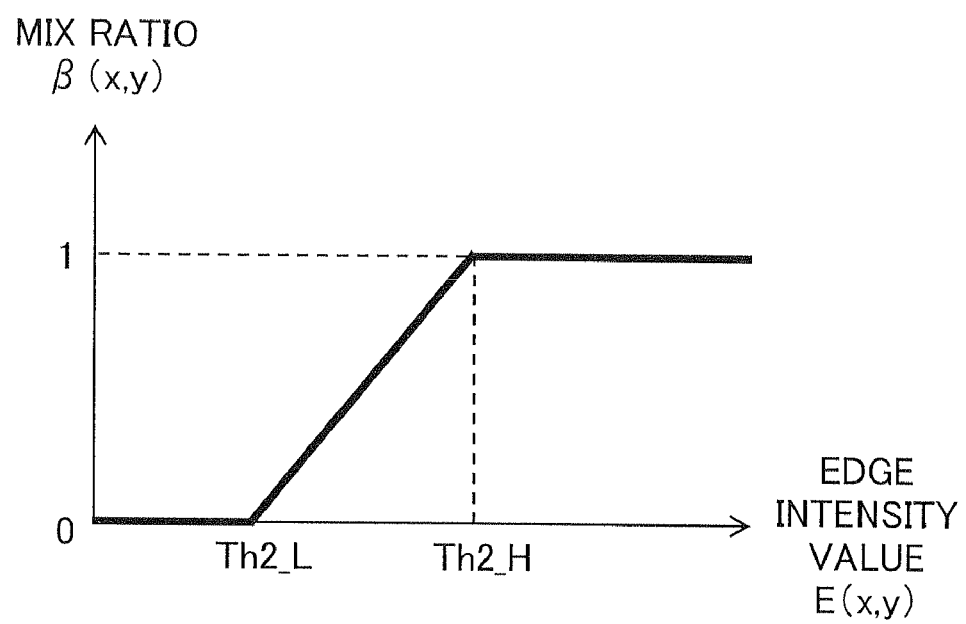
FIG. 12 is a diagram showing a relationship between an edge intensity value obtained in the edge intensity value calculation portion in FIG. 5 and a mix ratio at which pixel signals of the short-exposure image and the third intermediary image are mixed.

An example of the relationship between the edge intensity value E(x, y) and the mix ratio β(x, y) is shown in FIG. 12. In a case where the example of the relationship in FIG. 12 is adopted, when "E(x, y)<Th2_L" holds, "β(x, y)=0";
when "Th2_L≦E(x, y)<Th2_H" holds, "β(x, y)=(E(x, y)−Th2_L)/(Th2_H−Th2_L)"; and
when "Th2_H≦E(x, y)" holds, "β(x, y)=1."

Here, Th2_L and Th2_H are predetermined threshold values that fulfill "0<Th2_L<Th2_H." In a case where the example of the relationship in FIG. 12 is adopted, as the edge intensity value E(x, y) increases from the threshold value Th2_L to the threshold value Th2_H, the corresponding mix ratio β(x, y) linearly increases from 0 to 1. The mix ratio β(x, y) may instead be made to increase non-linearly.

The second synthesis portion 56 determines, from the edge intensity values E(x, y) at individual pixel positions, the mix ratios β(x, y) at those pixel positions, and then mixes the pixel signals of corresponding pixels between the third intermediary image and the short-exposure image according to formula (6) below to generate the pixel signals of the correction aim image. Here, $P_{OUT}(x, y)$, $P_{IN\_SH}(x, y)$, and P3(x, y) represent the pixel signals at pixel position (x, y) on the correction aim image, the short-exposure image, and the third intermediary image respectively.

$$P_{OUT}(x,y)=\beta(x,y)\times P_{IN\_SH}(x,y)+\{1-\beta(x,y)\}\times P3(x,y) \quad (6)$$

The pixel signals $P_{OUT}(x, y)$, $P_{IN\_SH}(x, y)$, and P3(x, y) represent the luminance and color of the pixel at pixel position (x, y) on the correction aim image, the short-exposure image, and the third intermediary image respectively, and represent them, for example, in an RGB or YUV format. For example, in a case where the pixel signals P3(x, y) etc. each consist of R, G, and B signals, for each of the R, G, and B signals, the pixel signals $P_{IN\_SH}(x, y)$ and P3(x, y) are mixed to generate the pixel signal $P_{OUT}(x, y)$. A case where the pixel signals P3(x, y) etc. each consist of Y, U, and V signals can be dealt with by similar processing.

Figure 13:
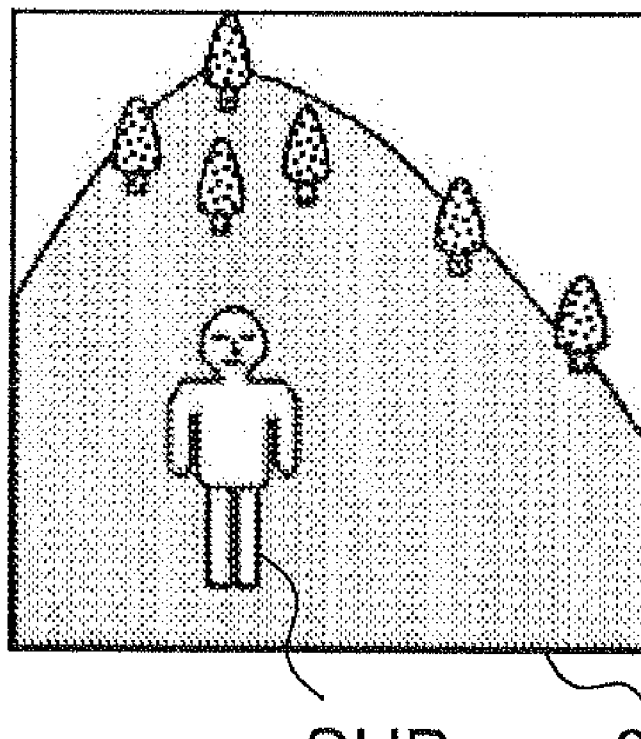
FIG. 13 is a diagram showing a correction aim image obtained by synthesizing a short-exposure image and a third intermediary image.

FIG. 13 shows an example of the correction aim image obtained in the second synthesis portion 56. The correction aim image 316 shown in FIG. 13 is based on the short- and proper-exposure images 310 and 311 shown in FIGS. 3A and 3B. In edge parts, the degree of contribution β(x, y) of the short-exposure image 310 to the correction aim image 316 is high; thus, in the correction aim image 316, the slight unsharpness of edges in the third intermediary image 314 (see FIG. 10) is improved, and edges are rendered sharp. On the other hand, in non-edge parts (flat parts), the degree of contribution (1−β(x, y)) of the third intermediary image 314 to the correction aim image 316 is high; thus, in the correction aim image 316, less of the noise contained in the short-exposure image 310 is reflected. Noise is particularly visible in non-edge parts (flat parts), adjusting the synthesis ratio in terms of the mix ratio β(x, y) as described above is effective.

As described above, according to Example 1, by synthesizing the proper-exposure image (more precisely, the position-adjusted proper-exposure image (i.e., the first intermediary image)) and the noise-reduced short-exposure image (i.e., the second intermediary image) by use of the differential values obtained from them, it is possible to generate the third intermediary image in which blur in the proper-exposure image and noise in the short-exposure image have been reduced. Thereafter, by synthesizing, by use of the edge intensity values obtained from the noise-reduced short-exposure image (i.e., the second intermediary image), the third intermediary image and the short-exposure image, it is possible to make the correction aim image reflect sharp edges in the short-exposure image and simultaneously make the correction aim image reflect less of the noise in the short-exposure image. Thus, the correction aim image contains little blur and little noise.

To detect edges and noise in a clearly separated fashion, and to satisfactorily avoid noise in the short-exposure image mixing into the correction aim image, it is preferable to derive the edge intensity value from the noise-reduced short-exposure image (i.e., the second intermediary image), but it is also possible to derive the edge intensity value from the short-exposure image before noise reduction (e.g., from the short-exposure image 310 in FIG. 3A). In that case, $P2_Y(x, y)$ in formula (5) is first substituted by the luminance value of the pixel at pixel position (x, y) on the short-exposure image before noise reduction, and then the edge intensity value E(x, y) is calculated according to formula (5).

Figure 14:
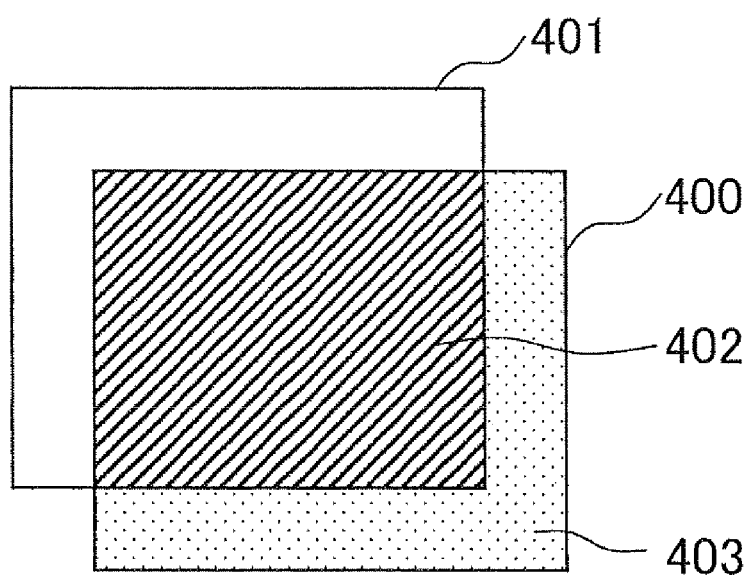
FIG. 14 is a diagram showing a positional relationship between the image regions of a short-exposure image and a proper-exposure image, both position-adjusted.

In reality, between the image region of the short-exposure image and the image region of the position-adjusted proper-exposure image, there exists an image region where they do not overlap (it has been ignored in the description above for the sake of simplicity). Specifically, as shown in FIG. 14, generally, the position of the entire image region 400 of the short-exposure image does not completely coincide with the position of the entire image region 401 of the position-adjusted proper-exposure image, and the region 402 (hereinafter referred to as the overlap region 402) over which the entire image regions 400 and 401 overlap is smaller in size than either of the entire image regions 400 and 401. In FIG. 14, the overlap region 402 appears as a hatched region.

The noise reduction portion 52, the differential value calculation portion 53, the first synthesis portion 54, the edge intensity value calculation portion 55, and the second synthesis portion 56 can, based on the pixel signals within the overlap region 402 on the short-exposure image and the pixel signals within the overlap region 402 on the first intermediary image, generate the correction aim image such that it has as its entire image region the overlap region 402. In this case, the entire image region of the correction aim image is smaller in size than that of the short-exposure image.

Instead, it is possible to generate the pixel signals within the non-overlap region 403 on the correction aim image from the pixel signals within the non-overlap region 403 on the second intermediary image (e.g., the former pixel signals are made identical with the latter pixel signals). It is also possible to generate the pixel signals within the overlap region 402 on the correction aim image based on the pixel signals within the overlap region 402 on the short-exposure image and the pixel signals within the overlap region 402 on the first intermediary image, and then fit together the overlap region 402 and the non-overlap region 403 on the correction aim image to form the entire image region of the correction aim image. In this case, the entire image region of the correction aim image is the same in size as that of the short-exposure image. Here, the non-overlap region 403 denotes the region that remains when the overlap region 402 is excluded from the entire image region 400 of the short-exposure image, and in FIG. 14 appears as a dotted region.

EXAMPLE 2

Next, Example 2 of the invention will be described. Through image synthesis processing involving position adjustment between a short-exposure image and a proper-exposure image described with regard to Example 1, it is possible to generate an image with little blur and little noise, but the position adjustment cannot always be executed accurately. Failure of position adjustment may result in, in the correction aim image, the subject appearing doubly or, in synthesis processing, an abnormally high synthesis ratio of one image, producing much blur or noise in the correction aim image.

In Example 2, consideration is given to possibility that position adjustment may fail, so that, even when position adjustment is likely to fail, it is possible to generate an image with little blur and little noise. To achieve that, an image correction portion according to Example 2 is provided with a function of estimating predictively—prior to execution of position adjustment between the short- and proper-exposure images—whether the position adjustment is likely to succeed or fail, or a function of estimating post factum—after execution of position adjustment between the short- and proper-exposure images—whether the position adjustment is considered to have succeeded or failed. Although estimation of whether position adjustment has succeeded or failed can be performed after execution of position adjustment, in the following description, it is assumed that the estimation is executed before execution of position adjustment. It should be noted that what is referred to simply as "position adjustment" is position adjustment between the short- and proper-exposure images.

Figure 15:
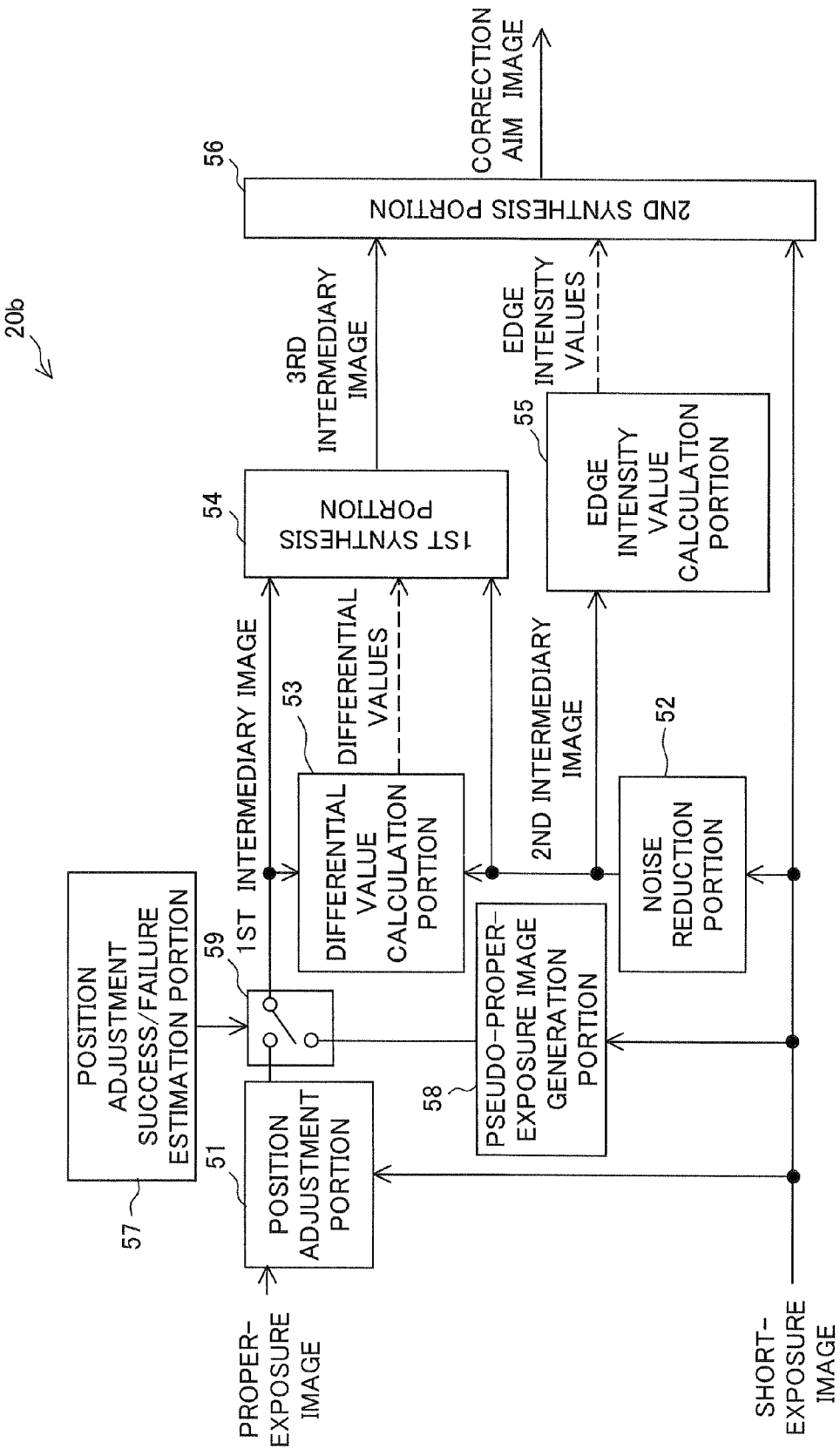
FIG. 15 is an internal block diagram of an image correction portion according to Example 2 of the invention.

FIG. 15 is an internal block diagram of an image correction portion 20b according to Example 2. In Example 2, the image correction portion 20b is used as the image correction portion 20 in FIG. 1. The image correction portion 20b is provided with blocks identified by the reference signs 51 to 59. The image data of the short- and proper-exposure images obtained by consecutive shooting is fed to the image correction portion 20b. In some cases, however, no proper-exposure image is shot, and the image data of the short-exposure image alone is fed to the image correction portion 20b (the details will be given later).

A position adjustment success/failure estimation portion 57 (hereinafter abbreviated to success/failure estimation portion 57) is provided with the above-mentioned estimation function with regard to the position adjustment by the position adjustment portion 51. The success/failure estimation portion 57, on estimating that position adjustment is likely to succeed, outputs a success-estimated signal to a selection portion 59 and, on estimating that position adjustment is likely to fail, outputs a failure-estimated signal to the selection portion 59. The method of estimation here will be described in detail later; before that, first, the functions and other features of the other blocks shown in FIG. 15 will be described.

A pseudo-proper-exposure image generation portion 58 (hereinafter abbreviated to generation portion 58) applies noise reduction processing and smoothing processing to the short-exposure image, and outputs the resulting noise-reduced, smoothed short-exposure image as a pseudo-proper-exposure image. The noise reduction processing and smoothing processing here are executed such that the noise level (in other words, the signal-to-noise ratio) in the pseudo-proper-exposure image is substantially equal to that in the actual proper-exposure image, and that the magnitude of blur contained in the pseudo-proper-exposure image is substantially equal to that in the actual proper-exposure image. That is, the noise reduction processing and smoothing processing are executed such that the pseudo-proper-exposure image is an image simulating the actual proper-exposure image.

The noise reduction processing in the generation portion 58 is similar to that in the noise reduction portion 52. For example, noise in the short-exposure image is reduced by spatial domain filtering using a median filter. The resulting noise-reduced short-exposure image is then subjected to, for example, spatial domain filtering using a smoothing filter to generate the pseudo-proper-exposure image. Usable as a smoothing filter for achieving smoothing processing is a Gaussian filter. This is because degradation of an image due to camera shake can be approximated to with blurring resulting from smoothing using a Gaussian filter. Through the smoothing processing by the generation portion 58, the short-exposure image is given degradation-by-blurring, and this makes the pseudo-proper-exposure image similar to the actual proper-exposure image.

Based on the result of position adjustment success/failure estimation by the success/failure estimation portion 57, the selection portion 59 selects one of the position-adjusted proper-exposure image outputted form the position adjustment portion 51 and the pseudo-proper-exposure image outputted from the generation portion 58, and outputs the selected image to the differential value calculation portion 53 and to the first synthesis portion 54. The image selected by the selection portion 59 functions as the first intermediary image in Example 2 (and also in Example 3 described later). More specifically, when the success/failure estimation portion 57 outputs a success-estimated signal, the selection portion 59 selects the position-adjusted proper-exposure image to output it as the first intermediary image; when the success/failure estimation portion 57 outputs a failure-estimated signal, the selection portion 59 selects the pseudo-proper-exposure image to output it as the first intermediary image.

The blocks identified by the reference signs 51 to 56 within the image correction portion 20b are the same as those within the image correction portion 20a in FIG. 5, and the operation, executed after the selection portion 59 outputs the first intermediary image, for generating the correction aim image based on the first intermediary image and the short-exposure image is the same as that in Example 1.

If the above-mentioned mix ratios $\alpha(x, y)$ and $\beta(x, y)$ to be set by the first and second synthesis portions 54 and 56 are improper such that the degree of contribution of the short-exposure image (and the second intermediary image) to the correction aim image is too high, noise is visible in the correction aim image; by contrast, if they are improper such that the degree of contribution of the proper-exposure image to the correction aim image is too high, the correction aim image has unnecessarily degraded sharpness. Accordingly, it is preferable to adjust beforehand a parameter for determining the mix ratio $\alpha(x, y)$ from the differential value $DIF(x, y)$ and a parameter for determining the mix ratio $\beta(x, y)$ from the edge intensity value $E(x, y)$ such as to obtain a proper balance between sharpness and noise in the correction aim image. For example, it is preferable to prevent loss of sharpness in the correction aim image by adjusting the above parameter beforehand such that the degree of contribution of the short-exposure image (and the second intermediary image) to the correction aim image is maximized within a range in which noise in the correction aim image is hardly visible.

Operation Flow Chart

Figure 16B:
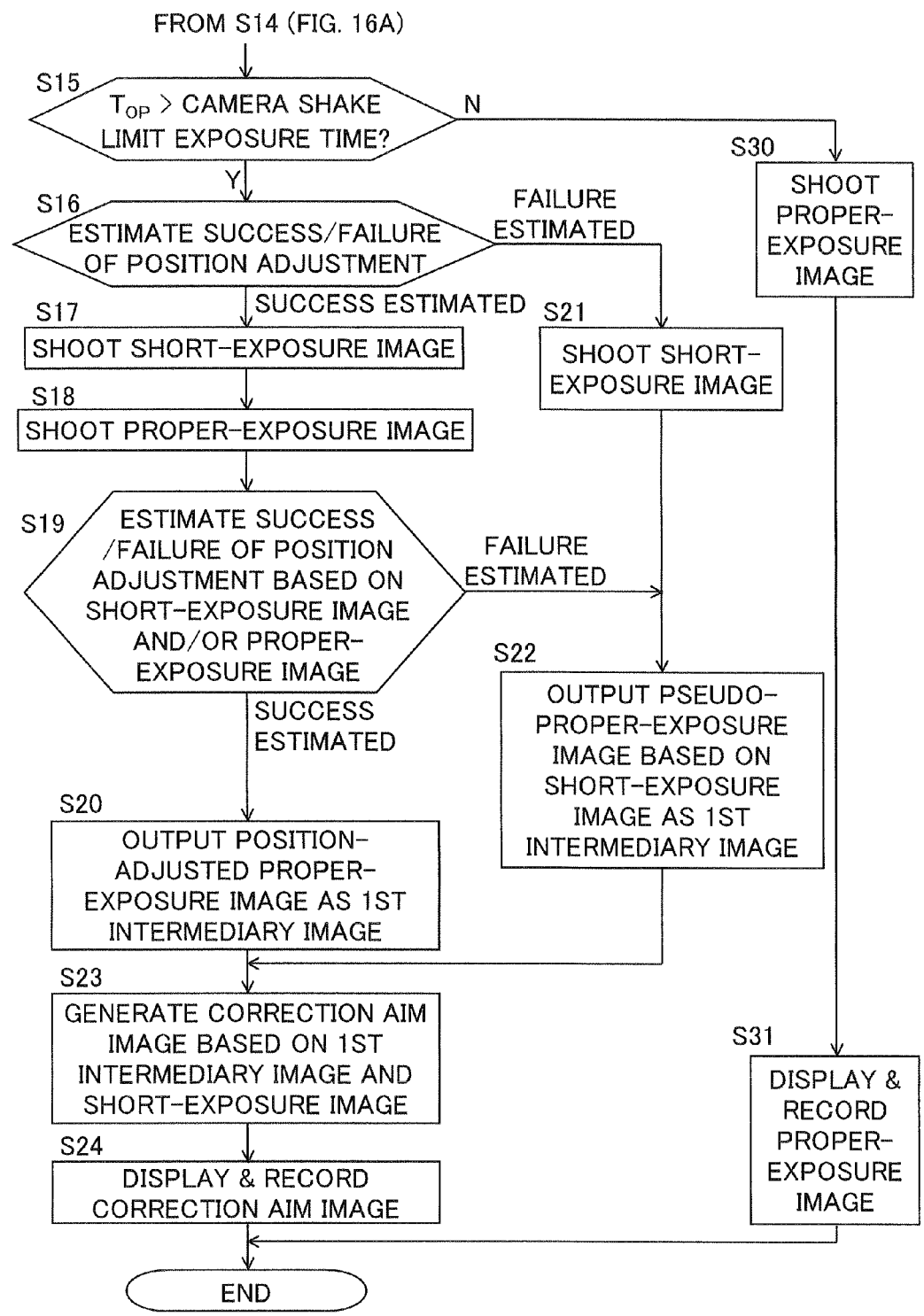

Next, with reference to FIGS. 16A and 16B, the procedure of the operation of the image sensing apparatus 1 including the image correction portion 20b will be described. FIGS. 16A and 16B together show a flow chart representing the flow of that operation. Now, along this flow chart, the flow of the operation of the image sensing apparatus 1 (in particular, the image correction portion 20b) will be described.

First, in step S11, the main control portion 13 checks whether or not the shutter release button 17a is in the halfway pressed state, and if it recognizes the shutter release button 17a to be in the halfway pressed state, it executes pre-exposure. It then, in step S12, determines the proper exposure time $T_{OP}$ based on the level of the output signal of the AFE 12 resulting from the pre-exposure. Based on the level of the output signal of the AFE 12 resulting from the pre-exposure, the lightness of the subject on image is detected, and based on the detected lightness, the proper exposure time $T_{OP}$ is determined. Moreover, in step S13, based on the current position of the zoom lens 30, the focal length of the image sensing portion 11 is detected, and the detected focal length is taken as a focal length $f_L$. The focal length $f_L$ is the focal length of the image sensing portion 11 at the time of shooting of the proper- and short-exposure images. As a result of the current position of the zoom lens 30 being identified, the current optical zoom magnification is identified.

Thereafter, in step S14, the main control portion 13 checks whether or not the shutter release button 17a is in the fully pressed state, and if it recognizes the shutter release button 17a to be in the fully pressed state, it then, in step S15, compares the proper exposure time $T_{OP}$ with the camera shake limit exposure time. Usable as the camera shake limit exposure time is, for example, the reciprocal of the focal length $f_L$. If the proper exposure time $T_{OP}$ is equal to or shorter than the camera shake limit exposure time, it is judged that the proper-exposure image to be shot with the proper exposure time $T_{OP}$ will contain almost no blur ascribable to camera shake, and an advance is made from step S15 to step S30, so that the processing in steps S30 and S31 is executed. Specifically, in step S30, the proper-exposure image alone is shot, and then, in step S31, the proper-exposure image is displayed on the display portion 15, and the image data of the proper-exposure image is recorded to the recording medium 16. Now the operation in FIGS. 16A and 16B comes to an end. When the image data is recorded to the recording medium 16, the image data may be compressed by a predetermined compression method (this applies also in step S24, which will be described later).

On the other hand, if in step S15, the proper exposure time $T_{OP}$ is longer than the camera shake limit exposure time, then, in step S16, the success/failure estimation portion 57 estimates whether position adjustment is likely to succeed or fail. In the success/failure estimation in step S16, whether position adjustment between the short- and proper-exposure images that are going to be shot will succeed or not is estimated predictively (the method of estimation here will be described later).

If, in step S16, it is estimated that position adjustment is likely to succeed, then, in steps S17 and S18, the short- and proper-exposure images are shot consecutively with the exposure time $T_{SH}$ and the proper exposure time $T_{OP}$ respectively. The image data of the thus obtained short- and proper-exposure images is fed to the image correction portion 20b. In the example shown in FIG. 16B, the short- and proper-exposure images are shot the former first and the latter next; they may instead be shot the latter first and the former next. As described previously, the exposure time $T_{SH}$ is shorter than the proper exposure time $T_{OP}$, and is set at, for example, $T_{OP}/4$. The exposure time $T_{SH}$ may be set equal to, or at any exposure time shorter than, the camera shake limit exposure time After the short- and proper-exposure images are shot in steps S17 and S18, in step S19, the success/failure estimation portion 57 estimates once again whether position adjustment is likely to succeed or fail. In the success/failure estimation in step S19, based on the image data of the short- and proper-exposure images obtained by shooting in steps S17 and S18, or based on the image data of one of those image, whether or not position adjustment is likely to succeed is estimated predictively (the method for estimation here will be described later).

If, in step S19, it is estimated that position adjustment is likely to succeed, then, in step S20, a success-estimated signal is outputted from the success/failure estimation portion 57 to the selection portion 59. Thus, the position-adjusted proper-exposure image obtained by feeding the short- and proper-exposure images shot in steps S17 and S18 to the position adjustment portion 51 is selected in the selection portion 59, and, in step S20, the position-adjusted proper-exposure image is outputted as the first intermediary image.

If, in step S19, it is estimated that position adjustment is likely to fail, then, in step S22, a failure-estimated signal is outputted from the success/failure estimation portion 57 to the selection portion 59. Thus, if, in step S19, it is estimated that position adjustment is likely to fail, the pseudo-proper-exposure image generated by the generation portion 58 based on the short-exposure image shot in step S17 is selected by the selection portion 59 and, in step S22, the pseudo-proper-exposure image is outputted as the first intermediary image.

On the other hand, if, in step S16, it is estimated that position adjustment is likely to fail, then, in step S21, the short-exposure image alone is shot with the exposure time $T_{SH}$, and then an advance is made to step S22. Also in this case, a failure-estimated signal is outputted from the success/failure estimation portion 57 to selection portion 59. Thus, if, in step S16, it is estimated that position adjustment is likely to fail, the pseudo-proper-exposure image generated by the generation portion 58 based on the short-exposure image shot in step S21 is selected by the selection portion 59 and, in step S22, the pseudo-proper-exposure image is outputted as the first intermediary image.

After the first intermediary image is outputted from the selection portion 59 in step S20 or S22, the processing in steps S23 and S24 is executed. Specifically, in step S23, based on the first intermediary image outputted from the selection portion 59 in step S20 or S22 and the short-exposure image obtained by shooting in step S17 or S21, the image correction portion 20b generates the correction aim image according to the method described above. Thereafter, in step S24, the correction aim image thus obtained is displayed on the display portion 15, and the image data of the correction aim image is recorded to the recording medium 16. Now the operation in FIGS. 16A and 16B comes to an end.

Although, in the flow chart in FIG. 16B, whether or not position adjustment is likely to succeed or fail is estimated in each of steps S16 and S19, one of these steps may be omitted. In a case where the success/failure estimation in step S19 is omitted, shooting of the short- and proper-exposure images in steps S17 and S18 is always followed by an advance to step S20 follows, where the position-adjusted proper-exposure image is outputted as the first intermediary image.

In a case where the success/failure estimation in step S16 is omitted, the processing in step S21 is also omitted; thus, a judgment in step S15 that the proper exposure time $T_{OP}$ is longer than the camera shake limit exposure time always leads, via shooting of the short- and proper-exposure images in steps S17 and S18, to execution of success/failure estimation in step S19.

Method for Position Adjustment Success/Failure Estimation

The method by which the success/failure estimation portion 57 estimates whether position adjustment is likely to succeed or fail will now be described in detail. The success/failure estimation portion 57 can perform the estimation by various methods. Below will be presented, as methods usable for position adjustment success/failure estimation, a first to a third estimation method. The first or second estimation method can be used as the method for position adjustment success/failure estimation in step S16, and the third estimation method can be used as the method for position adjustment success/failure estimation in step S19.

First Success/Failure Estimation Method: First, the first success/failure estimation method will be described. In the first success/failure estimation method, position adjustment success/failure estimation is performed based on shooting conditions set with respect to the proper-exposure image. The shooting conditions here include the proper exposure time $T_{OP}$ and the focal length $f_L$.

Generally, as the proper exposure time $T_{OP}$ or the focal length $f_L$ increases, the proper-exposure image contains more blur ascribable to camera shake. The same is true with blur ascribable to subject movement. If camera shake or subject movement is too large, the proper-exposure image contains too much blur. This lowers the accuracy of the displacement (the motion vector described earlier) calculated for position adjustment, and as a result increases the probability of failure of position adjustment. With this taken into consideration, in the first success/failure estimation method, whether position adjustment is likely to succeed or fail is estimated based on the proper exposure time $T_{OP}$ and the focal length $f_L$ determined in steps S12 and S13.

Specifically, for example, a coordinate system as shown in FIG. 17 is defined that has exposure time on the horizontal axis and focal length on the vertical axis. On this coordinate system, checking curves 501 and 502 are prepared that define a relationship between exposure time and focal length, and a point ($T_{OP}$, $f_L$) that fulfills the proper exposure time $T_{OP}$ and the focal length $f_L$, is mapped on the coordinate system for consideration. In FIG. 17, when the point ($T_{OP}$, $f_L$) is located within the hatched region (region filled by hatching) 504 located on the lower left side of the checking curve 502, it is considered that the proper exposure time $T_{OP}$ is shorter than the camera shake limit exposure time, and that the proper-exposure image contains negligibly little blur ascribable to camera shake. Accordingly, in the operation procedure in FIG. 16B, when the point ($T_{OP}$, $f_L$) is located within the hatched region 504, an advance is made from step S15 to step S30, so that the proper-exposure image alone is shot. As described earlier, the camera shake limit exposure time can be given as the reciprocal of the focal length $f_L$.

Even if the point ($T_{OP}$, $f_L$) is not located within the hatched region 504, that is, even if the proper exposure time $T_{OP}$ is longer than the camera shake limit exposure time, when the point ($T_{OP}$, $f_L$) is located within the dotted region (region filled by dots) 503 located on the lower left side of the checking curve 501 but not overlapping the hatched region 504, not much blur is expected. Accordingly, when the point ($T_{OP}$, $f_L$) is located within the dotted region 503, it is estimated that position adjustment is likely to succeed, and a success-estimated signal is outputted. On the other hand, when the point ($T_{OP}$, $f_L$) is located neither in the dotted region 503 nor in the hatched region 504, it is estimated that position adjustment is likely to fail, and a failure-estimated signal is outputted.

The exposure time that borders between success and failure of position adjustment is called the position adjustment limit exposure time. The camera shake limit exposure time and the position adjustment limit exposure time are both a function of focal length, both decreasing as focal length increases. The checking curve 501 defines the relationship between position adjustment limit exposure time and focal length, and the checking curve 502 defines the relationship between camera shake limit exposure time and focal length. The actual amount of camera shake is influenced by the shape of the body of the image sensing apparatus 1, the characteristics of the shutter release button 17a, etc., and therefore it is preferable to determine the camera shake limit exposure time and the position adjustment limit exposure time (in other words, the shapes of the checking curves 502 and 501) beforehand in an appropriate manner, such as through experiments.

Instead of using both the proper exposure time $T_{OP}$ and the focal length $f_L$, it is also possible to estimate whether position adjustment is likely to succeed or not based on the proper exposure time $T_{OP}$ alone, or based on the focal length $f_L$ alone. For example, it is possible, when "$T_{OP}>T_{TH}$" or "$f_L>f_{TH}$" holds, to estimate that position adjustment is likely to fail and output a failure-estimated signal and, when "$T_{OP} \leq T_{TH}$" or "$f_L \leq f_{TH}$" holds, to estimate that position adjustment is likely to succeed and output a success-estimated signal. Here, $T_{TH}$ represents a fixed reference exposure time that is set beforehand without dependence on the focal length $f_L$, and $f_{TH}$ represents a fixed reference focal length that is set beforehand without dependence on the proper exposure time $T_{OP}$.

The following should be noted. A shooting condition of the proper-exposure image and a shooting condition of the short-exposure image are closely related. For example, while the above description mentions that the exposure time $T_{SH}$ of the short-exposure image may be set at $T_{OP}/4$, when the exposure time $T_{SH}$ is set at $T_{OP}/4$, determining the exposure time ($=T_{OP}/4$) and the focal length ($f_L$) at the time of shooting of the short-exposure image automatically determines the exposure time and the focal length at the time of shooting of the proper-exposure image. Accordingly, the first success/failure estimation method may be understood as a method for estimating whether position adjustment is likely to succeed or fail based on a shooting condition set for the short-exposure image. Here, so long as $T_{SH}$ is a function of $T_{OP}$, $T_{SH}$ may be other than $T_{OP}/4$ (where $T_{SH}<T_{OP}$).

Second Success/Failure Estimation Method: Next, the second success/failure estimation method will be described. In the second success/failure estimation method, prior to shooting of the short- and proper-exposure images in steps S17 and S18, or prior to shooting of the short-exposure image in step S21, or prior to shooting of the proper-exposure image in step S30, whether position adjustment is likely to succeed or fail is checked based on a preview image obtained from the image sensing portion 11.

Figure 18:
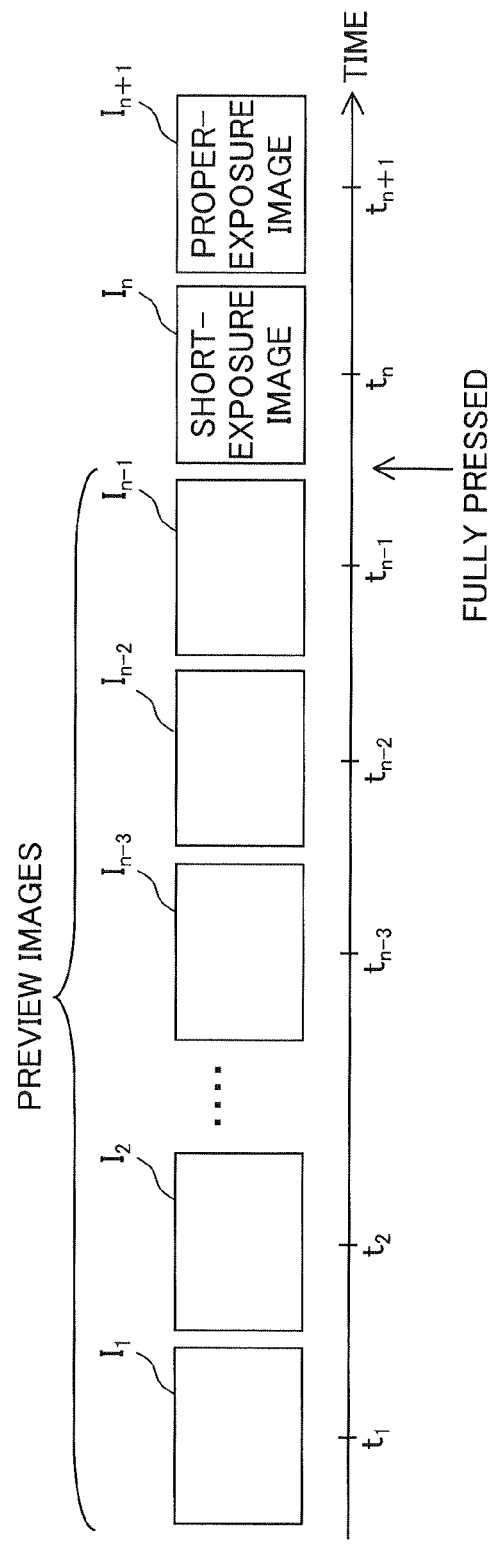
FIG. 18 is a diagram showing a sequence of shot images around a time point at which the shutter release button goes into a fully pressed state.

FIG. 18 shows a sequence of shot images around a time point at which the shutter release button 17a goes into the fully pressed state. In a shooting mode in which a still image can be shot, the image sensing apparatus 1 performs shooting periodically to generate a sequence of shot images. A sequence of shot images denotes a set of a plurality of chronologically ordered shot images. It is assumed here that, as time passes, time points $t_1, t_2, \ldots, t_{n-3}, t_{n-2}, t_{n-1}, t_n$, and $t_{n+1}$ occur in this order, and that by shooting at time points $t_1, t_2, \ldots, t_{n-3}, t_{n-2}$, and $t_{n-1}$, the image sensing portion 11 yields shot images $I_1, I_2, \ldots, I_{n-3}, I_{n-2}$, and $I_{n-1}$, respectively. It is also assumed that between time points $t_{n-1}$ and $t_n$, the shutter release button 17a goes into the fully pressed state, causing an advance from step S14 in FIG. 16A to step S15 in FIG. 16B. Here, n is an integer of 3 or more.

In this case, after the shutter release button 17a is fully pressed, at least one of the short- and proper-exposure images is shot. In the example shown in FIG. 18, it is assumed that, at time points $t_n$ and $t_{n+1}$ occurring after the full press of the shutter release button 17a, the short- and proper-exposure images $I_n$ and $I_{n+1}$ are shot. Depending on the results of branching in steps S15 and S16, however, after the shutter release button 17a is fully pressed, the short-exposure image alone, or the proper-exposure image alone, is shot.

The above-mentioned shot images $I_1, I_2, \ldots, I_{n-3}, I_{n-2},$ and $I_{n-1}$ are called preview images. The preview images acquired sequentially are displayed one after another on the display portion 15 in a constantly updated fashion, in the form of a moving image. In the second success/failure estimation method, whether position adjustment is likely to succeed or fail is estimated based on these preview images $I_1, I_2, \ldots, I_{n-3}, I_{n-2},$ and $I_{n-1}$. A few specific methods for that will be described below. Position adjustment success/failure estimation is achieved by one of a first to a fourth specific method described below. Two or more of the first to fourth specific methods may be combined to perform position adjustment success/failure estimation.

(i) A first specific method will now be described. In a case where the images (short- and proper-exposure images) targeted by position adjustment are flat and contain few edges, due to the characteristics inherent to position adjustment based on image data, it is considered that position adjustment is highly likely to fail. If preview images have corresponding image characteristics, it is highly likely that the images targeted by position adjustment themselves have such image characteristics. In view of this, in the first specific method, whether position adjustment is likely to succeed or fail is estimated based on the magnitude of edge intensity in preview images.

Specifically, for example, in a similar manner as in the method for generating the edge image 315 from the second intermediary image 312 through calculation of the edge intensity value $E(x, y)$ (see FIGS. 7 and 11), edge extraction processing is applied to preview image $I_{n-p}$ to generate an edge image of preview image $I_{n-p}$, and the average value of individual pixel signal values on the edge image of preview image $I_{n-p}$ (in other words, the average luminance of the edge image) is found as an edge evaluation value. Thereafter, the edge evaluation value is compared with a predetermined threshold value. If the edge evaluation value is equal to or less than the threshold value, it is estimated that position adjustment is likely to fail and a failure-estimated signal is outputted; otherwise, it is estimated that position adjustment is likely to succeed and a success-estimated signal is outputted. Here, p is an integer of 1 or more, and most preferably p=1.

(ii) A second specific method will now be described. In a case where the movement of an object between two shot images obtained by consecutive shooting involves a plurality of different motions, it is difficult to accurately detect the displacement between the two images. If preview images have corresponding image characteristics, it is highly likely that the images targeted by position adjustment themselves have such image characteristics. In view of this, in the second specific method, whether position adjustment is likely to succeed or fail is estimated based on presence/absence of a plurality of different motions on image.

Specifically, for example, the processing proceeds as follows. A first to an Nth characteristic point are extracted from preview image $I_{n-2}$; then image matching (e.g., block matching) is performed between preview images $I_{n-2}$ and $I_{n-1}$, and N characteristic points on preview image corresponding to the first to Nth characteristic points on preview image $I_{n-2}$ are extracted (where N is an integer of 2 or more). A characteristic point denotes a point that is distinguishable from the surrounding points and that are easy to trace. Such a characteristic point can be extracted automatically by use of a well-known characteristic point extractor (unillustrated) that detects a pixel across which density varies greatly in the horizontal and vertical directions. Examples of characteristic point extractors include the Harris corner detector, and the SUSAN corner detector. Then, for each characteristic point on preview image $I_{n-2}$, the vector directed from the position of that characteristic point on preview image $I_{n-2}$ to the position of the corresponding characteristic point on preview image $I_{n-1}$ is found as a characteristic point movement vector. The characteristic point movement vectors found for the first to Nth characteristic points are represented by $MV_1$ to $MV_N$. Thereafter, the variance of characteristic point movement vectors $MV_1$ to $MV_N$ is compared with a predetermined threshold value. If the variance is equal to or more than the threshold value, it is estimated that a plurality of different motions as described above are present, and hence that position adjustment is likely to fail, and a failure-estimated signal is outputted; otherwise, it is estimated that position adjustment is likely to succeed and a success-estimated signal is outputted.

When the average vector of characteristic point movement vectors $MV_1$ to $MV_N$ is represented by $MV_{AVE}$, for each characteristic point movement vector, the differential vector between it and the average vector $MV_{AVE}$ is found, and the average value of the magnitudes of the N differential vectors thus obtained can be used as the variance of characteristic point movement vectors $MV_1$ to $MV_N$.

Although, in the example described above, position adjustment success/failure estimation is performed based on checking of presence/absence of a plurality of different motions by use of preview images $I_{n-2}$ and $I_{n-1}$ obtained immediately before shooting of the short-exposure image, it is also possible, instead of using preview images $I_{n-2}$ and $I_{n-1}$, to use preview images $I_{n-3}$ and $I_{n-2}$, or preview images $I_{n-4}$ and $I_{n-3}$.

(iii) A third specific method will now be described. In a case where a plurality of similar patterns are present within a shot image of interest, it is difficult to accurately detect the displacement between that shot image of interest and a shot image temporally adjacent to it. If preview images have corresponding image characteristics, it is highly likely that the images targeted by position adjustment themselves have such image characteristics. In view of this, in the third specific method, whether position adjustment is likely to succeed or fail is estimated based on presence/absence of a plurality of similar patterns on image.

Specifically, for example, the processing proceeds as follows. Within the short- and proper-exposure images 350 and 360 shown in FIGS. 6A and 6B, a block of interest 351 and a candidate block 361 are set; while the candidate block 361 is moved within a search area 362, processing similar to that by which the correlation value between the image within the block of interest 351 and the image within the candidate block 361 is calculated is applied to preview images $I_{n-2}$ and $I_{n-1}$. Specifically, the short-exposure image 350 and the proper-exposure image 360 described previously are read as preview images $I_{n-2}$ and $I_{n-1}$, and the correlation value with respect to preview images $I_{n-2}$ and $I_{n-1}$ is found by the method described previously.

As the candidate block set on preview image $I_{n-1}$ is moved, a plurality of correlation values with respect to preview images $I_{n-2}$ and $I_{n-1}$ are found, and each correlation value is associated with the corresponding position of the candidate block. It is here assumed that the plurality of correlation values thus found consist of a first to an Nth correlation value (where N is an integer of 2 or more), and, for the sake of convenience, it is also assumed that, for any integer i, the condition "the ith correlation value is equal to or less than the (i+1)th correlation value" holds. In this case, the first correlation value is the smallest of the first to Nth correlation values, and the second correlation value is the second smallest; when a pattern similar to one within the block of interest on preview image $I_{n-2}$ is present within the search area on preview image $I_{n-1}$, the difference between the first and second correlation values is very small (the difference may be zero).

Accordingly, the difference between the first and second correlation values is compared with a predetermined threshold value. If the difference is equal to or less than the threshold value, it is estimated that a plurality of similar patterns as described above are present, and hence that position adjustment is likely to fail, and a failure-estimated signal is outputted; otherwise, it is estimated that position adjustment is likely to succeed and a success-estimated signal is outputted.

Although, in the example described above, position adjustment success/failure estimation is performed based on checking of presence/absence of a plurality of similar patterns by use of preview images $I_{n-2}$ and $I_{n-1}$ obtained immediately before shooting of the short-exposure image, it is also possible, instead of using preview images $I_{n-2}$ and to use preview images $I_{n-3}$ and $I_{n-2}$, or preview images $I_{n-4}$ and $I_{n-3}$.

(iv) A fourth specific method will now be described. When the displacement between the short- and proper-exposure images 350 and 360 in FIGS. 6A and 6B is too large, the position of the candidate block 361 on the proper-exposure image 360 that should correspond to the block of interest 351 on the short-exposure image 350 lies beyond the search area 362, making accurate detection of a movement vector impossible. If, as when the camera operator is doing an intentional camera operation, preview images have a corresponding displacement, it is highly likely that the images targeted by position adjustment themselves have such a displacement. In view of this, in the fourth specific method, whether position adjustment is likely to succeed or fail is estimated based on the magnitude of a movement vector calculated with respect to a sequence of preview images. An intentional camera operation here denotes one in which the camera operator intentionally swings the body of the image sensing apparatus 1 horizontally or vertically (a panning or tilting operation).

Specifically, for example, the processing proceeds as follows. Every time a new preview image is obtained, the success/failure estimation portion 57 derives the movement vector between two temporally adjacent preview images obtained. The method for derivation here is the same as the previously described method for deriving the movement vector between the short- and proper-exposure images. The movement vector between preview images $I_i$ and $I_j$ is represented by MV[i, j]. Then, obtained are chronologically ordered movement vectors MV[1, 2], MV[2, 3], MV[3, 4], ..., MV[n−3, n−2], and MV[n−2, n−1]. These movement vectors (MV[1, 2] etc.) are especially called preview movement vectors. The success/failure estimation portion 57 constantly monitors the magnitude of preview movement vectors. When the magnitude of preview movement vectors gradually increases and eventually exceeds a predetermined threshold value, at this time point the success/failure estimation portion 57 judges that an intentional camera operation is started. After the success/failure estimation portion 57 judges that an intentional camera operation is started, when the magnitude of preview movement vectors remains equal to or less than the predetermined threshold value for a predetermined period, the success/failure estimation portion 57 judges that the intentional camera operation is ended.

While such checking for the start and end of an intentional camera operation is being performed, when the shutter release button 17a is recognized to be in the fully pressed state, the success/failure estimation portion 57 checks whether or not the time point of that recognition belongs to the period during which an intentional camera operation is being done. If the time point of the recognition belongs to the period during which an intentional camera operation is being done, it is estimated that position adjustment is likely to fail, and a failure-estimated signal is outputted; otherwise, it is estimated that position adjustment is likely to succeed, and a success-estimated signal is outputted.

Third Success/Failure Estimation Method: Next, the third success/failure estimation method will be described. In the third success/failure estimation method, position adjustment success/failure estimation is performed based on the image data of the short- and proper-exposure images obtained by shooting in steps S17 and S18, or based on the image data of one of those images.

The first to third specific methods described with regard to the second success/failure estimation method may be applied to the third success/failure estimation method. The following description of the third success/failure estimation method deals with a case where the short- and proper-exposure images obtained by shooting in steps S17 and S18 are assigned the symbols $I_n$ and $I_{n+1}$.

In a case where the first specific method is applied, it suffices to read preview image $I_{n-p}$ in the above description of the first specific method as the short-exposure image $I_n$ or the proper-exposure image $I_{n+1}$. Specifically, for example, according to the first specific method described above, the edge evaluation value of the short-exposure image $I_n$ or the proper-exposure image $I_{n+1}$ is found. If the edge evaluation value is equal to or less than a predetermined threshold value, it is estimated that position adjustment is likely to fail and a failure-estimated signal is outputted; otherwise, it is estimated that position adjustment is likely to succeed and a success-estimated signal is outputted.

In a case where the second specific method is applied, it suffices to read preview images $I_{n-2}$ and $I_{n-1}$ in the above description of the second specific method as the short-exposure image $I_n$ and the proper-exposure image $I_{n+1}$ respectively. Specifically, for example, according to the second specific method described above, the variance of characteristic point movement vectors $MV_1$ to $MV_N$ with respect to the short-exposure image $I_n$ and the proper-exposure image $I_{n+1}$ is found. If the variance is equal to or more than a threshold value, it is estimated that a plurality of different motions as described above are present, and hence that position adjustment is likely to fail, and a failure-estimated signal is outputted; otherwise, it is estimated that position adjustment is likely to succeed and a success-estimated signal is outputted.

In a case where the third specific method is applied, it suffices to read preview images $I_{n-2}$ and $I_{n-1}$ in the above description of the third specific method as the short-exposure image $I_n$ and the proper-exposure image $I_{n+1}$ respectively. Specifically, for example, according to the third specific method described above, a plurality of correlation values with respect to the short-exposure image $I_n$ and the proper-exposure image $I_{n+1}$ are found. If the difference between the smallest and second smallest of the plurality of correlation values is equal to or less than the threshold value, it is estimated that a plurality of similar patterns as described above are present, and hence that position adjustment is likely to fail, and a failure-estimated signal is outputted; otherwise, it is estimated that position adjustment is likely to succeed and a success-estimated signal is outputted.

Workings and Benefits of Example 2

In a case where the proper exposure time $T_{OP}$ etc. is so long that it is estimated that camera shake is likely to cause much blur, or in a case where image characteristics are such that it is estimated that movement vectors for displacement detection are likely to be calculated with low accuracy, it is highly likely that position adjustment will fail. In such cases, if position adjustment actually fails and nevertheless blur correction is performed based on the short- and proper-exposure images, then, in synthesis processing, an abnormally high synthesis ratio of one image produces much blur or noise in the correction aim image. Needless to say, however, coping with such cases simply by shooting the proper-exposure image alone does not achieve an effect of blur correction.

In view of this, in Example 2, when it is estimated that position adjustment is likely to fail, the correction aim image is generated by a blur correction method that does not require position adjustment, that is, one based only on the short-exposure image. The pseudo-proper-exposure image generated based on the short-exposure image is an image that simulates the actual proper-exposure image. Accordingly, it is expected that blur and noise in the correction aim image generated from the short-exposure image and the pseudo-proper-exposure image will be substantially equal to those in the correction aim image generated from the short- and proper-exposure images. That is, according to Example 2, even when it is estimated that position adjustment is likely to fail, it is possible to generate an image with little blur and little noise.

Moreover, when failure of position adjustment is estimated, by omitting shooting of the proper-exposure image and performing shooting of the short-exposure image alone (see steps S16 and S21 in FIG. 16B), it is possible to save the processing time and power consumption needed for shooting of the proper-exposure image.

Moreover, as will be clear from the block diagram in FIG. 15, some common blocks are shared between those involved in the function of generating the correction aim image by use of the short- and proper-exposure images and those involved in the function of generating the correction aim image by use of the short-exposure image alone. Thus, the latter function can be added with a small circuit scale. As an alternative when it is estimated that position adjustment is likely to fail in step S16 in FIG. 16B, it is possible to shoot the short-exposure image with the exposure time $T_{SH}$ in step S21 and take this short-exposure image itself as the correction aim image. In that case, the second synthesis portion 56 in FIG. 15 outputs the image data of the short-exposure image intact as the image data/of the correction aim image. From the viewpoint of reducing blur in the correction aim image, it is more advantageous to output the short-exposure image intact as the correction aim image than to generate, with position adjustment having failed, the correction aim image from the short- and proper-exposure images.

EXAMPLE 3

Next, Example 3 of the invention will be described. Example 3 deals with a modified example of the method for generating the pseudo-proper-exposure image. Example 3 is implemented in combination with Example 2, and according to the method for generating the pseudo-proper-exposure image described with regard to Example 3, the generation portion 58 in FIG. 15 can generate the pseudo-proper-exposure image.

In the method for generating the pseudo-proper-exposure image according to Example 3, when the pseudo-proper-exposure image is generated, not only the short-exposure image but also an actually shot proper-exposure image is referred to. Accordingly, when it is estimated that position adjustment is likely to fail in step S16 in FIG. 16B, in a case where the method for generating the pseudo-proper-exposure image according to Example 3 is adopted, it is preferable to shoot the short- and proper-exposure images consecutively in step S21.

In Example 3, the pseudo-proper-exposure image is generated by applying spatial domain filtering using an averaging filter FIL to the short-exposure image. The averaging filter FIL has a filter size of m×m (i.e., the filter size in each of the horizontal and vertical directions is m), where m is an integer of 3 or more. The averaging filter FIL is a spatial domain filter that averages the pixel signals within an image region of m×m pixels centered around a pixel position of interest and outputs the obtained average pixel signal as the pixel signal at the pixel position of interest after spatial domain filtering.

Here, the filter size of the averaging filter FIL is left variable. The generation portion 58 then adjusts the filter size of the averaging filter FIL (i.e., adjusts the value of m) such that the pseudo-proper-exposure image to be generated from the short-exposure image has a noise level substantially equal to that in the proper-exposure image obtained by actual shooting.

To achieve that adjustment, the generation portion 58 first receives the image data of the short- and proper-exposure images obtained by shooting and calculates the standard deviation $\sigma_S$ of the pixel signal values of the short-exposure image and the standard deviation $\sigma_L$ of the pixel signal values of the proper-exposure image. For example, $\sigma_S$ is the standard deviation of the luminance values at individual pixels of the short-exposure image, and $\sigma_L$ is the standard deviation of the luminance values at individual pixels of the proper-exposure image.

It is generally known that, when spatial domain filtering is executed that involves calculating the average of the pixel signals of q pixels, the noise level in an image after spatial domain filtering is $1/\sqrt{q}$ of that before spatial domain filtering. In the present specification, represents the positive square root of i (where i is a positive value). The noise level in a given image is expressed by the positive square root of the standard deviation of the pixel signal values of that image. Thus, the noise level in the short-exposure image is $\sqrt{\sigma_S}$, and the noise level in the proper-exposure image is $\sqrt{\sigma_L}$.

Since the filter size of the averaging filter FIL is m×m, spatial domain filtering using the averaging filter FIL averages the pixel signals of $m^2$ pixels. Thus, when the short-exposure image is subjected to spatial domain filtering using the averaging filter FIL, the noise level in the short-exposure image after spatial domain filtering is $\sqrt{\sigma_S}/m$.

In Example 3, this short-exposure image after spatial domain filtering is taken as the pseudo-proper-exposure image. If the noise level in this pseudo-proper-exposure image is equal to the noise level in the actual proper-exposure image, "$\sqrt{\sigma_S}/m = \sqrt{\sigma_L}$" holds. Accordingly, the generation portion 58 determines the value of in according to formula (7) below, and subjects the short-exposure image to spatial domain filtering using an averaging filter FIL having a filter size reflecting the result of the determination to generate the pseudo-proper-exposure image. This makes the noise level in the pseudo-proper-exposure image substantially equal to that in the actual proper-exposure image, and thus makes it possible to generate, from the short-exposure image alone, a correction aim image equivalent to the correction aim image generated from the proper- and short-exposure images.

$$m = \text{Round}\left(\sqrt{\frac{\sigma_S}{\sigma_L}}\right) \quad (7)$$

The operation represented by the symbol "Round" in formula (7) rounds up or down the decimal part of the operand so that the value of the operand is rounded off to the nearest integer. The operator "Round" in formula (7) operates on $\sqrt{\sigma_S/\sigma_L}$. For example, when j is an integer, if "j−0.5≦

$\sqrt{\sigma_S/\sigma_L} < j+0.5$," then j is taken as the value of m, and, if "$j+0.5 \leq \sqrt{\sigma_S/\sigma_L} < j+1.5$," then (j+1) is taken as the value of m.

VARIATIONS, MODIFICATIONS, ETC

The specific values given in the description above are merely examples, which, needless to say, may be modified to any other values. In connection with the embodiments described above, modified examples or supplementary explanations applicable to them will be given below in Notes 1 and 2. Unless inconsistent, any part of the contents of these notes may be combined with any other.

Notes 1: The image sensing apparatus 1 may be realized in hardware, or in a combination of hardware and software. In particular, all or part of the processing performed within the image correction portion (20, 20a, or 20b) may be realized in hardware, in software, or in a combination of hardware and software. In a case where the image sensing apparatus 1 is built on a software basis, a block diagram with regard to the part realized with software serves as a functional block diagram of that part.

Notes 2: For example, the following interpretations are possible. It is possible to consider that the image correction portion 20b in FIG. 15 is provided with a first correction portion that, through position adjustment between a short-exposure image and a proper-exposure image, synthesizes the two images and thereby generates a correction aim image, and a second correction portion that generates a correction aim image from a short-exposure image. It is possible to consider that the first correction portion is composed of the blocks identified by the reference signs 51 to 56, and that the second correction portion is composed of the blocks identified by the reference signs 52 to 56 and 58. It is possible to consider that the success/failure estimation portion 57 and the selection portion 59 form a correction control portion that alternatively makes one of the first and second correction portions operate.

What is claimed is:

1. An image sensing apparatus including an image sensing portion outputting image data of an image by shooting, the image sensing apparatus generating an output image based on output data of the image sensing portion obtained in response to a predetermined shooting command, the image sensing apparatus comprising:
   a first correction portion which, based on image data of a first image shot by the image sensing portion and image data of a second image shot by the image sensing portion with an exposure time longer than an exposure time of the first image, performs position adjustment between the first and second images and then synthesizes the first and second images to generate the output image;
   a second correction portion which generates the output image by reducing noise in the first image without using the second image; and
   a correction control portion which executes selection processing to alternatively select one of the first and second correction portions based on a shooting condition set for shooting of the second image or based on the output data of the image sensing portion, and which makes the so selected correction portion generate the output image;
   wherein taken as the shooting condition of the second image is the exposure time of the second image and a focal length at a time of shooting of the second image, and wherein the correction control portion executes the selection processing based on at least one of the exposure time of the second image and the focal length; and
   wherein the correction control portion checks whether the position adjustment succeeds or fails based on at least one of the exposure time of the second image and the focal length at the time of shooting of the second image, the correction control portion selecting the first correction portion on judging that the position adjustment succeeds and selecting the second correction portion on judging that the position adjustment fails.

2. The image sensing apparatus according to claim 1, wherein, when the second correction portion is selected in the selection processing, the second image is not shot.

3. An image sensing apparatus including an image sensing portion outputting image data of an image by shooting, the image sensing apparatus generating an output image based on output data of the image sensing portion obtained in response to a predetermined shooting command, the image sensing apparatus comprising:
   a first correction portion which, based on image data of a first image shot by the image sensing portion and image data of a second image shot by the image sensing portion with an exposure time longer than an exposure time of the first image, performs position adjustment between the first and second images and then synthesizes the first and second images to generate the output image;
   a second correction portion which generates the output image by reducing noise in the first image without using the second image; and
   a correction control portion which executes selection processing to alternatively select one of the first and second correction portions based on a shooting condition set for shooting of the second image or based on the output data of the image sensing portion, and which makes the so selected correction portion generate the output image;
   wherein, by using an image degradation portion which generates an image by giving degradation-by-blurring to the first image and a noise reduction portion which generates an image by reducing noise in the first image, the second correction portion synthesizes the image generated by the image degradation portion and the image generated by the noise reduction portion to generate the output image.

4. The image sensing apparatus according to claim 1, wherein the first correction portion generates the output image by synthesizing the first and second images and an image obtained by reducing noise in the first image.

5. An image sensing apparatus including an image sensing portion outputting image data of an image by shooting, the image sensing apparatus generating an output image based on output data of the image sensing portion obtained in response to a predetermined shooting command, the image sensing apparatus comprising:
   a first correction portion which, based on image data of a first image shot by the image sensing portion and image data of a second image shot by the image sensing portion with an exposure time longer than an exposure time of the first image, performs position adjustment between the first and second images and then synthesizes the first and second images to generate the output image;
   a second correction portion which generates the output image by reducing noise in the first image without using the second image; and
   a correction control portion which executes selection processing to alternatively select one of the first and second correction portions based on a shooting condition set for shooting of the second image or based on the output data of the image sensing portion, and which makes the so selected correction portion generate the output image;

wherein the correction control portion checks whether the position adjustment succeeds or fails based on the output data of the image sensing portion obtained before or after the shooting command is given, the correction control portion selecting the first correction portion on judging that the position adjustment succeeds and selecting the second correction portion on judging that the position adjustment fails.

* * * * *